United States Patent [19]

Cutler et al.

[11] 4,280,085
[45] Jul. 21, 1981

[54] APPARATUS AND METHOD FOR PROVIDING A SIGNAL PROPORTIONAL TO FLUX IN AN AC MOTOR FOR CONTROL OF MOTOR DRIVE CURRENT

[75] Inventors: John H. Cutler, Roanoke; Loren H. Walker, Salem, both of Va.

[73] Assignee: General Electric Company, Salem, Va.

[21] Appl. No.: 32,856

[22] Filed: Apr. 24, 1979

[51] Int. Cl.³ .................. H02P 5/34; H02P 5/36
[52] U.S. Cl. .................. 318/803; 318/798; 318/807
[58] Field of Search .................. 318/798–803, 318/805, 807, 809, 810

[56] References Cited

U.S. PATENT DOCUMENTS

| | | | |
|---|---|---|---|
| 3,593,083 | 7/1971 | Blaschke | 318/803 |
| 4,023,083 | 5/1977 | Plunkett | 318/802 |
| 4,044,285 | 8/1977 | Plunkett et al. | 318/803 |
| 4,047,083 | 9/1977 | Plunkett | 318/807 |
| 4,119,893 | 10/1978 | Bayer et al. | 318/798 X |
| 4,207,509 | 6/1980 | Forssell | 318/798 |

*Primary Examiner*—J. V. Truhe
*Assistant Examiner*—Richard M. Moose
*Attorney, Agent, or Firm*—Arnold E. Renner

[57] ABSTRACT

An apparatus and method for providing signals indicative of the magnitude and angular position of the DC motor flux of an AC induction motor is disclosed. The AC induction motor provides controllable rotation and torque in accordance with a drive current of variable magnitude and frequency. A first signal is provided proportional to the rate of change of the flux of the motor. A second signal is supplied proportional to the magnitude of the drive current. A flux signal is generated proportional to the integral of the first signal when the frequency of the output signal is above a preselected value and which is proportional to the second signal when the frequency of the output signal is below the preselected value. A representative value for the preselected frequency value is 3 Hertz in a 60 Hertz drive system. The flux signal is effective to control the generation of the drive current. An embodiment of the present invention is shown for the case where the motor is stopped at a predetermined position in accordance with a predetermined conduction state of the inverting supplying the drive current. Additional embodiments are shown for the general cases where the motor can be stopped at any position and where two flux axes or three flux axes are sensed. The present invention is particularly applicable for use in an AC induction motor drive system.

27 Claims, 8 Drawing Figures

APPARATUS AND METHOD FOR PROVIDING A SIGNAL PROPORTIONAL TO FLUX IN AN AC MOTOR FOR CONTROL OF MOTOR DRIVE CURRENT

BACKGROUND OF THE INVENTION

1. Field Of The Invention

The present invention relates generally to control systems for AC induction motors and, more particularly, to an apparatus and method for providing signals, indicative of the magnitude and angular position of the motor flux of an AC induction motor, to control the motor drive current.

2. Prior Art

The AC induction motor is increasingly being used as a source of controllable rotation and torque. Such an AC induction motor can be driven by an output or drive current signal of variable magnitude and frequency to produce a desired rotation and torque.

As is well known, the drive current is supplied to the stator windings of the AC induction motor. The drive current in the stator windings creates flux in the motor, which causes torque to be produced when the drive current in the stator windings is at an angle to the flux field of the rotor of the motor.

The level of flux is an important parameter to measure and use to control the generation of the drive current to ensure that the motor produces the desired rotation and torque. Typically, two flux measurements are used to achieve desired control of the generation of the drive current: the first axis flux signal proportional to the first axis component of the flux produced by the drive current in the stator windings; the second axis flux signal proportional to the second axis component of the flux produced by the drive current in the stator windings. Often, the first axis and the second axis are substantially orthogonal with respect to each other. The first and second axes flux signals allow the magnitude and angular position of the motor flux in two dimensions to be known at each instant.

Conventional apparatus and methods can provide signals indicative of the magnitude and angular position of the motor flux at any instant when the motor is in the rotating state. However, it is often desirable to operate the motor in the substantially non-rotating state, either at substantial torque or at substantially zero torque. Examples of where such operation is desirable are manifold, including when the motor is required to stop and maintain the load torque at a fixed position.

When the motor is in the substantially non-rotating state, however, it becomes very important to maintain the values of the flux signals indicating the magnitude and angular position of the non-rotating, or DC, motor flux so that when the motor is taken out of the non-rotating state, undesirable motor response does not occur.

As is well known, the frequency of the drive current is typically substantially zero when the motor is in the substantially non-rotating state at zero torque. For this reason, the flux present in the motor is termed DC flux when the frequency of the drive current is substantially zero.

A Hall device is a conventional sensor which provides an output signal proportional to the level of the DC flux. As is well known, however, the Hall device is extremely fragile, is highly susceptible to damage caused by mechanical shock and vibrations, and is expensive to manufacture.

Several other conventional approaches allow the measurement of the magnitude and angular position of the motor flux when the motor is not in the substantially non-rotating state. Such approaches include measuring the rate of change of motor flux in accordance with the terminal voltages of the motor and sensing the rate of change of motor flux using flux coils. With both of these approaches, the level of the signal proportional to the rate of change of motor flux can be calculated using the following formula:

$$e = N d\psi/dt,$$

where:
- $e$ = the voltage level of the rate of change of motor flux signal;
- $N$ = constant; and
- $d\psi/dt$ = rate of change of the stator flux of the motor.

As is apparent, the value for $d\psi/dt$ goes to zero as the frequency of the drive current goes to zero: the magnitude of the e signal goes to zero when the frequency goes to zero. Thus, the two conventional approaches which measure rate of change of motor flux do not provide a signal indicative of the DC flux when the frequency of the drive current is substantially zero, even when the magnitude of the DC flux is substantial.

An additional problem with conventional apparatus and methods for providing control signals indicative of the magnitude and angular position of the motor flux when the frequency of the drive current is substantially zero is that the integrators used to integrate the e signals to produce the flux signals cannot maintain, over a substantial time period, the value of the motor flux immediately prior to the time when the frequency went to zero. Thus, the flux signals provided when DC flux is present tend to vary due to undesirable drift present in conventional integrators, causing the flux signals to be incorrect when the motor is taken out of the non-rotating state. This incorrect value for the DC flux causes undesirable responses by the motor when the frequency is again made greater than zero.

OBJECTS OF THE INVENTION

It is an object of the present invention to provide an apparatus and method for providing a flux signal indicative of the magnitude and angular position of the DC motor flux of an AC induction motor.

It is another object of the present invention to provide an apparatus and method for providing flux signals indicative of the magnitude and angular position of the motor flux of an AC induction motor irrespective of the frequency of the drive current driving the motor.

It is a further object of the present invention to provide an apparatus and method for generating a flux signal proportional to the integral of a first signal, which is proportional to the rate of change of flux of the AC induction motor, when the frequency of the drive current is above a pre-selected value and which is proportional to a second signal, which is proportional to the current magnitude of the drive current, when the frequency of the drive current is below the preselected value and the torque is substantially zero, the flux signal being effective to control the generation of the drive current.

It is another object of the present invention to provide an apparatus and method for generating flux signals indicative of the magnitude and angular position of the DC motor flux when the AC induction motor is stopped in any position in accordance with any valid conduction state of an inverter supplying the drive current and the frequency of the drive current is zero.

It is a further object of the present invention to stop the motor in a fixed position in accordance with a predetermined conduction state of an inverter supplying the drive current and to generate a flux signal proportional to the magnitude of the portion of the output signal that produces flux having only a preselected axis component.

These and other objects are achieved by the apparatus and method of the present invention.

SUMMARY OF THE INVENTION

An apparatus and method for providing signals indicative of the magnitude and angular position of the DC motor flux of an AC induction motor is disclosed. A drive current of variable magnitude and frequency is generated for driving the AC induction motor. A first signal is provided proportional to the rate of change of the flux of the motor. A second signal is supplied proportional to the current magnitude of the drive current. A flux signal is generated proportional to the integral of the first signal when the frequency of the drive current is above a preselected value and which is proportional to the second signal when the frequency of the drive current is below the preselected value. The flux signal is effective to control the generation of the drive current. As an example, the preselected value of the frequency can be less than or equal to 3 Hz in a 60 Hz system. The first signal can be provided by a flux coil or a means responsive to the terminal voltages of the motor.

In one embodiment, a control signal is generated when the frequency of the drive current is below the preselected value. A flux signal is generated by integrating the first signal when the control signal is absent and by a signal divider connected to receive the second signal when the control signal is present. The first signal can be integrated using an amplifier having an inverting input and an output, with the inverting input connected to receive the first signal, and with a capacitor connected between the inverting input and the output. The signal divider can include an impedence divider having an input, an output and a divider output, with the input connected to receive the second signal, with the output connected to the output of the amplifier, and with the divider output adapted to be connected to the inverting input of the amplifier in response to the control signal. When the control signal is present, the integrating effect of the capacitor is swamped out and the amplifier operates as a gain amplifier.

In another embodiment of the apparatus and method of the present invention, the stator windings of the AC induction motor are arranged with respect to a first axis and a second axis. The drive current of variable magnitude and frequency is applied to the stator windings to produce a flux having a first axis component and a second axis component. A first signal is provided proportional to the rate of change of the second axis component of the flux. A second signal is provided proportional to the magnitude of that portion of the drive current that produces the second axis component of the flux. The inverter which supplies the drive current is cycled to and stopped at a predetermined conduction state so as to generate drive current that produces flux having only the second axis component. A flux signal is generated proportional to the integral of the first signal when the frequency of the drive current is above the preselected value and proportional to the second signal when the frequency of the drive current has dropped below the preselected value and the inverter has been cycled to and stopped at the predetermined conduction state. The flux signal is effective to control the generation of the drive current.

In an additional embodiment of the present invention, flux signals are provided indicative of the magnitude and angular position of the DC motor flux when the inverter supplying drive current to the AC motor is at any conduction state and the frequency of the drive current is below a preselected value. In this embodiment, the AC motor has stator windings arranged with respect to a first axis and a second axis. The drive current of variable magnitude and frequency is applied to the stator windings to produce a flux having a first axis component and a second axis component. A first signal is provided proportional to the rate of change of the first axis component of the flux. A second signal is supplied proportional to the magnitude of that portion of the drive signal that produces the first axis component of the flux. A first flux signal is generated proportional to the integral of the first signal when the frequency of the drive current is above the preselected value and is proportional to the second signal when the frequency of the drive current is below the preselected value. A third signal is provided proportional to the rate of change of the second axis component of the flux. A fourth signal is supplied proportional to the magnitude of that portion of the drive current that produces the second axis component of the flux. A second flux signal is generated proportional to the integral of the third signal when the frequency of the drive current is above the preselected value and is proportional to the fourth signal when the frequency of the drive current is below the preselected value. The first and second flux signals are effective to control the generation of the drive current.

In another embodiment similar to the immediately preceding embodiment, three flux axes of the AC motor are sensed and are used to provide using respective identical circuits of the present invention a first axis flux signal, a second axis flux signal and a third axis flux signal.

The apparatus and method of the present invention is particularly applicable for use in AC motor drive systems.

DETAILED DESCRIPTION OF THE INVENTION

Figure 1:
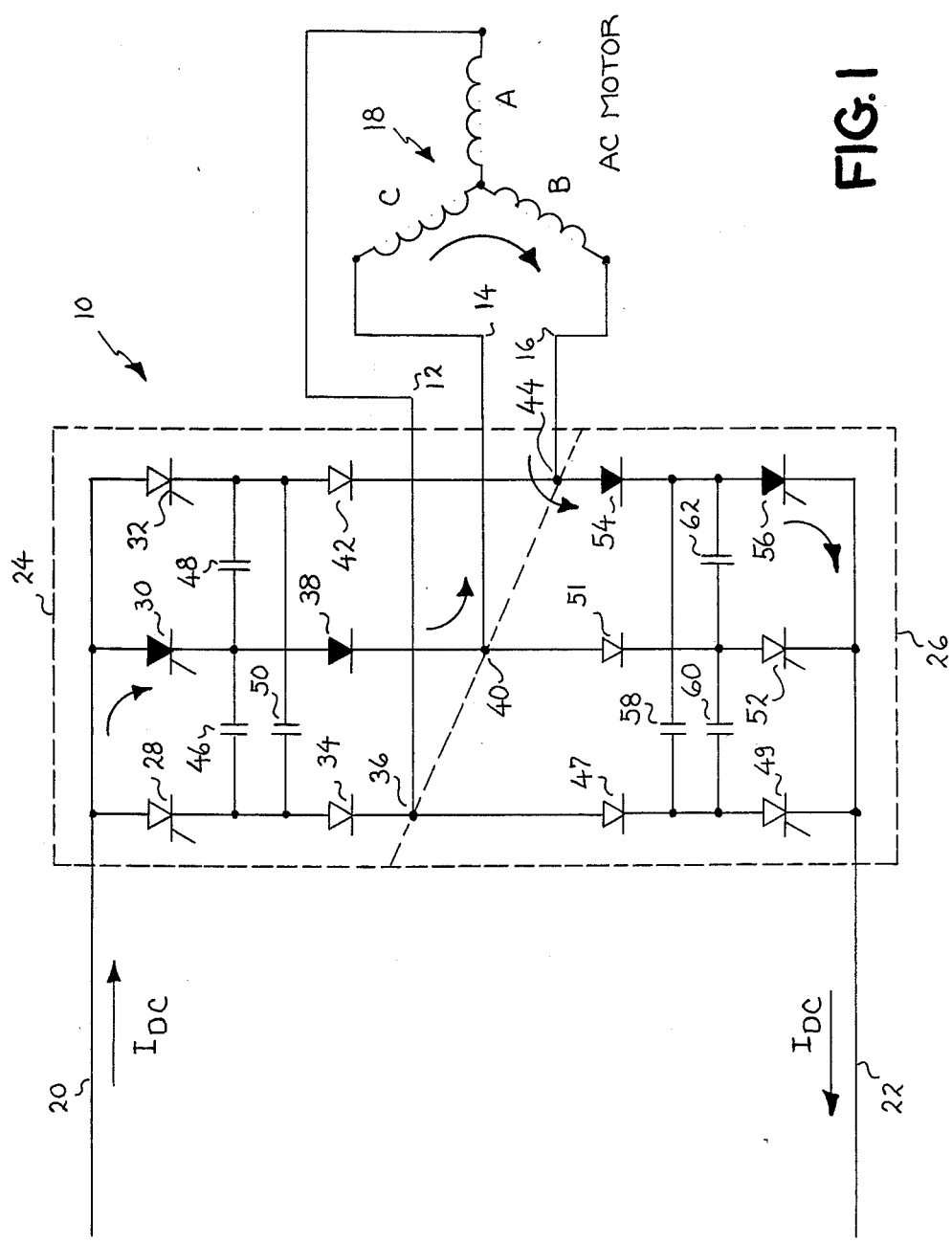
FIG. 1 is a schematic diagram of a conventional inverter for generating the drive current of variable magnitude and frequency that drives an AC motor.

Referring to FIG. 1, a conventional inverter, designated generally by reference numeral 10, is shown for providing a drive current of variable magnitude and frequency on lines 12, 14 and 16 to a load, such as an AC induction motor, designated generally by reference numeral 18. An incoming DC signal $I_{DC}$ of controllable magnitude is supplied to inverter 10 on an incoming line 20 and an outgoing line 22. The inverter 10 is divided up into a positive half 24 and a negative half 26.

Positive half 24 and the negative half 26 each includes three legs, with each leg in the respective positive or negative half having a conduction controlled rectifying device. (It should be understood that inverter 10 can have two or more legs for each half.) Each conduction controlled rectifying device has an anode (first power electrode), a gate and a cathode (second power electrode). As is well known, a conduction controlled rectifying device is normally in the non-conducting state, but goes into the conducting state when the potential on the anode (first power electrode) is positive with respect to the potential on the cathode (second power electrode) and a gating pulse is provided to the gate. The conduction controlled rectifying device remains in the conducting state until the potential on the cathode becomes positive with respect to the potential on the anode. The conduction controlled rectifying devices in the positive and negative halves 24, 26, respectively, can be of any suitable type such as thyratrons, mercury arc rectifiers such as ignitrons and excitrons, and thyristors, but the thyristor is the preferred form.

Specifically, as shown in FIG. 1, positive half 24 has a thyristor 28 in a first leg, a thyristor 30 in a second leg, and a thyristor 32 in a third leg. The anodes of thyristors 28, 30 and 32 are each effectively connected to incoming line 20. The anodes of thyristors 28, 30 and 32 can be effectively connected to incoming line 20 via respective inductors (not shown). The cathode of thyristor 28 is connected to the anode of a blocking diode 34, whose cathode is connected to a first output terminal 36. Terminal 36 is connected to line 12. Similarly, the cathode of thyristor 30 is connected to the anode of a blocking diode 38, whose cathode is connected to a second output terminal 40. Terminal 40 is connected to line 14. The cathode of thyristor 32 is connected to the anode of a blocking diode 42, whose cathode is connected to a third output terminal 44. Terminal 44 is connected to line 16.

A commutating capacitor is provided between the cathodes of each "pair" of thyristors on the positive half 24. A "pair" is defined herein as a unique set of two conduction controlled rectifying devices in an inverter where the gating of one is intended to terminate the conduction of the other. Thus, it is seen that there are three "pairs" in the positive half 24. Specifically, a commutating capacitor 46 is connected between the cathodes of thyristors 28 and 30, a commutating capacitor 48 is connected between the cathodes of thyristors 30 and 32, and a commutating capacitor 50 is connected between the cathodes of thyristors 28 and 32.

The negative half 26 also has three legs. In the first leg, the anode of a blocking diode 47 is connected to the first output terminal 36 and its cathode is connected to the anode of a thyristor 49. The cathode of thyristor 49 is effectively connected to outgoing line 22. In the second leg, the anode of a blocking diode 51 is connected to the second output terminal 40 and its cathode is connected to the second output terminal 40 and its cathode is connected to the anode of a thyristor 52. The cathode of thyristor 52 is effectively connected to the outgoing line 22. In the third leg, the anode of a blocking diode 54 is connected to the third output terminal 44 and its cathode is connected to the anode of a thyristor 56. The cathode of thyristor 56 is effectively connected to the outgoing line 22. The cathodes of thyristors 49, 52 and 56 can be effectively connected to the outgoing line 22 via respective inductors (not shown).

A commutating capacitor is provided between the anodes of each "pair" of thyristors in the negative half 26. It is seen that there are three "pairs" in the negative half 26. Specifically, a commutating capacitor 58 is connected between the anodes of thyristors 49 and 56, a commutating capacitor 60 is connected between the anodes of thyristors 49 and 52, and a commutating capacitor 62 is connected between the anodes of thyristors 52 and 56.

Proper operation of inverter 10 requires that one of the three top legs be in the conducting state and a different one of the three bottom legs also be in the conducting state in order for the drive current of variable magnitude and frequency to be supplied to motor 18. Thus, there can be six possible valid conduction states for inverter 10 because inverter 10 has three legs. As stated above, inverter 10 can have two or more legs. Thus, for example, an inverter having two legs would have two valid conduction states, an inverter having three legs would have six valid conduction states, and an inverter having four legs would have twelve valid conduction states.

Motor 18 has three stator windings A, B and C in wye connection that are supplied the drive current by lines 14, 16 and 12 from inverter 10. For purposes of illustration, thyristor 30 and blocking diode 38 in the second leg of positive half 24 are blackened to indicate that they are in the conduction state. Similarly, blocking diode 54 and thyristor 56 in the third leg of the negative half 26 are also blackened to indicate that they are in the conducting state. Thus, as shown by the arrows, the drive current of variable magnitude and frequency provided by inverter 10 is supplied by the second output terminal 40 and line 14 to winding C of motor 18. The drive current flows through windings C and B of motor 18, through the third leg of the negative half 26 via line 16, third output terminal 44, blocking diode 54, and thyristor 56, and out of the inverter 10 on outgoing line 22.

Thus, by selecting a valid conduction state by providing gating signals to the thyristors, inverter 10 can provide a drive current through desired stator windings of motor 18. The significance of the preselected conduction state becomes apparent in the discussion below of the embodiment of the present invention shown in FIG. 5. For present purposes, it should be understood that the magnitude of the drive current is controlled by the magnitude of the incoming DC signal $I_{DC}$, and that the frequency of the drive current is varied by the rate of the gating signals supplied to the thyristors in the positive and negative halves of the inverter 10.

In order to produce desired rotation and torque from motor 18, the drive current supplied by the inverter 10 must have an appropriate magnitude and frequency. Many control systems exist for controlling the magnitude and frequency of the drive current in order that the AC electric motor produces the desired rotation and torque. Suitable control systems are present in the AC electric motor drive systems of FIGS. 7 and 8 discussed below.

The magnitude and direction of the flux present in the AC motor 18 are important parameters that should be known at each instant in order to provide a drive current that causes the motor 18 to produce the desired rotation and torque. The magnitude and direction of flux indicate the level of torque that the motor 18 is capable of producing at any given instant of operation.

Figure 2:
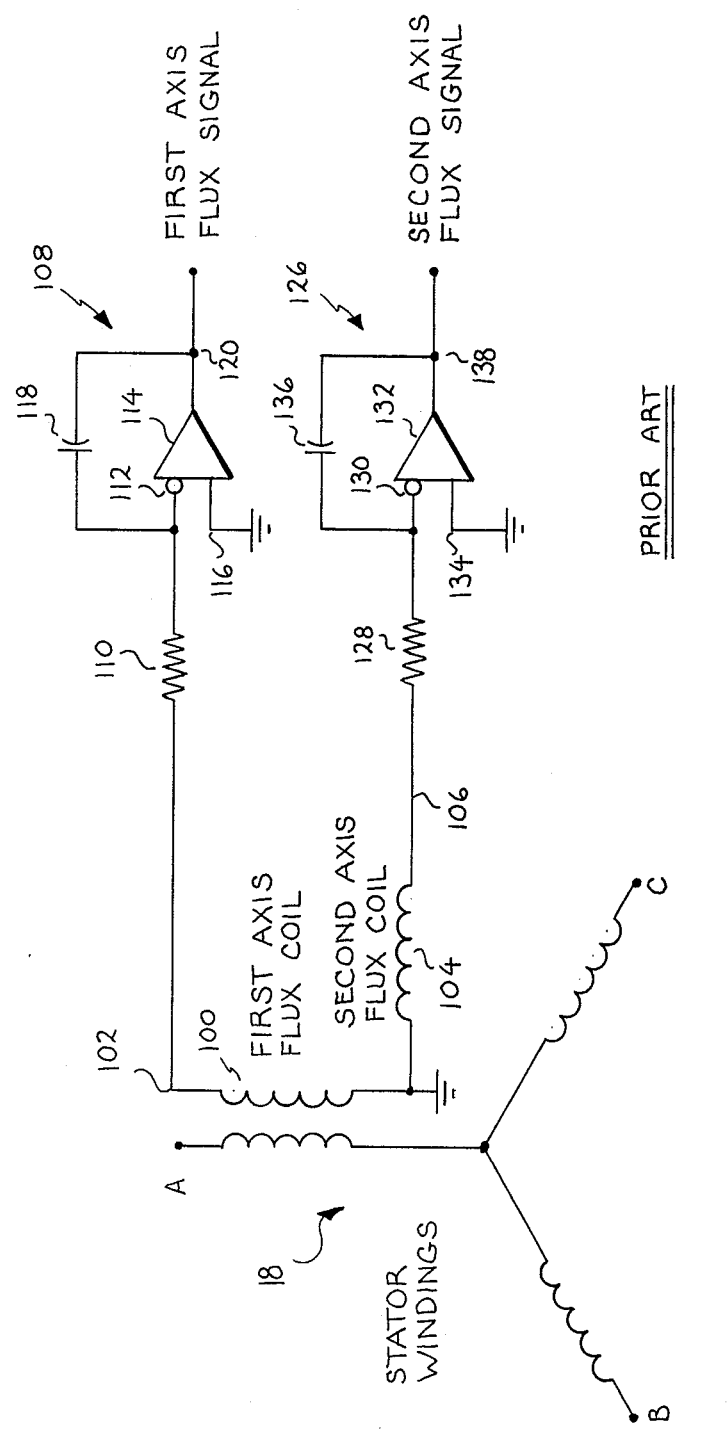
FIG. 2 is a block diagram of a prior art apparatus for providing a first axis flux signal and a second axis flux signal indicative of the first axis flux and the second axis flux, respectively, of an AC motor.

Referring now to FIG. 2, a conventional apparatus is shown for providing flux signals indicative of the magnitude and angular position of the flux of motor 18. Measuring the terminal voltages of motor 18 or the use of flux coils are alternatives for measuring the magnitude and angular position of the motor flux. Each approach produces a rate of change of flux signal e having a voltage level in accordance with the equation $e = N d\psi/dt$, where N is a constant and where $d\psi/dt$ is the rate of change of the flux in the winding of motor 18 whose terminal voltage is being measured or in the axis of the flux coil, respectively.

When a flux coil is used to sense the level of flux in the motor, the magnitude of the output voltage e present on the terminals of the flux coil is proportional to the rate of change of the motor flux along the axis of the flux coil. Thus, the magnitude and direction of the motor flux, when the motor flux is not a DC flux, can be detected in two dimensions using a flux coil along a first axis of the stator windings of the motor and a flux coil along a second axis of the stator windings of the motor, where the first axis and the second axis, for example, may be substantially orthogonal with respect to each other.

Such an orthogonal arrangement is shown in FIG. 2, where a first axis flux coil 100 provides an output voltage on a terminal 102 which is proportional to the rate of change of flux along the axis of the coil 100, which has been designated as the first axis of motor 18. In the case shown in FIG. 2, motor 18 has three stator windings, winding A, winding B, and winding C, which are spaced in motor 18 at substantially equal 120° angles. The first axis flux coil 100 is physically mounted in the motor so that, for example, its axis coincides with the axis of stator winding A. Thus, the voltage at terminal 102 is directly proportional to the rate of change of the first axis flux produced by the drive current flowing through winding A.

A second axis flux coil 104 is in this case physically mounted to be substantially orthogonal with respect to the first axis flux coil 100 in motor 18. Thus, second axis flux coil 104 provides on a terminal 106 a voltage whose magnitude is proportional to the second axis component of the level of flux produced by the drive current flowing through windings B and/or C.

As indicated by the equation for e above, the output voltage at terminal 102 is proportional to the rate of change of the first axis flux component in motor 18. Consequently, the first axis flux signal can be produced by integrating the signal present at terminal 102. The integration of the signal present on terminal 102 is provided by an integrator, designated generally by reference numeral 108. Integrator 108 includes a scaling resistor 110 connected between terminal 102 and an inverting input 112 of an operational amplifier 114. A non-inverting input 116 of operational amplifier 114 is connected to electrical ground. An integrating capacitor 118 is connected between an output 120 of operational amplifier 114 and inverting input 112. The signal on output terminal 120 is an integral of the first axis rate of change of flux signal and, thus, is proportional to the first axis flux present in motor 18.

Similarly, a signal indicative of the second axis flux present in motor 18 is provided by integrating the second axis rate of change of flux signal present on terminal 106 of the second axis flux coil 104. The second axis rate of change of flux signal at terminal 106 is integrated by an integrator, designated generally by reference numeral 126. Specifically, a scaling resistor 128 is connected between terminal 106 of the second axis flux coil 104 and an inverting input 130 of an operational amplifier 132. A non-inverting input 134 of operational amplifier 132 is connected to electrical ground. An integrating capacitor 136 is connected between an output 138 of operational amplifier 132 and the inverting input 130. The signal present on output 138 is an integral of the second axis rate of change of flux signal and, thus, is proportional to the second axis flux of the motor 18.

As is well known, an AC induction motor can provide a desired level of flux while also providing a substantially zero rotation when the frequency of the drive current is substantially zero. Such a condition exists, for example, when one of the legs in the positive half 24 of inverter 10 is maintained in the conducting state, while another one of the legs in the negative half 26 of inverter 10 is also maintained in the conduction state over a substantial period of time. Thus, the drive current provided to the motor is essentially a DC signal. The magnitude of this DC drive current controls the level of flux produced in the motor, but because the frequency of the drive current is substantially zero, no rotation is produced by the motor even though it is producing flux.

The conventional flux detection circuit of FIG. 2, however, does not provide a first axis flux signal and a second axis flux signal which accurately indicate the level of the respective DC first axis flux and DC second axis flux. This inaccuracy for the DC flux state is due to two reasons. First, as the equation above indicates, the rate of change of flux signal e produced by the flux coils goes to zero as the rate of change of flux goes to zero, which is the case when DC flux is present. It should be noted that, when the rate of change of flux is zero, the level of flux can still be substantial, which is often the case when the motor is producing substantial flux at substantially zero rotation.

The second reason is due to the incapability of conventional integrators to maintain the value of a constant flux signal over a substantial period of time. The inaccuracies in maintaining the value of the flux signal is due to, among other things, internal drift in The integrator produced by the components, especially the amplifier and/or the integrating capacitors. Thus, in the case where DC flux is constant over a substantial time period, the value of the first axis and second axis flux signals will change over time due to the drift inherent in the integrators of the apparatus of FIG. 2.

These same deficiencies exist when the terminal voltages of motor 18 are used to sense the rate of change of the flux produced therein. Thus, for purposes of illustration, sensing the rate of change of flux using the terminal voltages of the motor windings is analogous to the use of flux coils.

Figure 3:
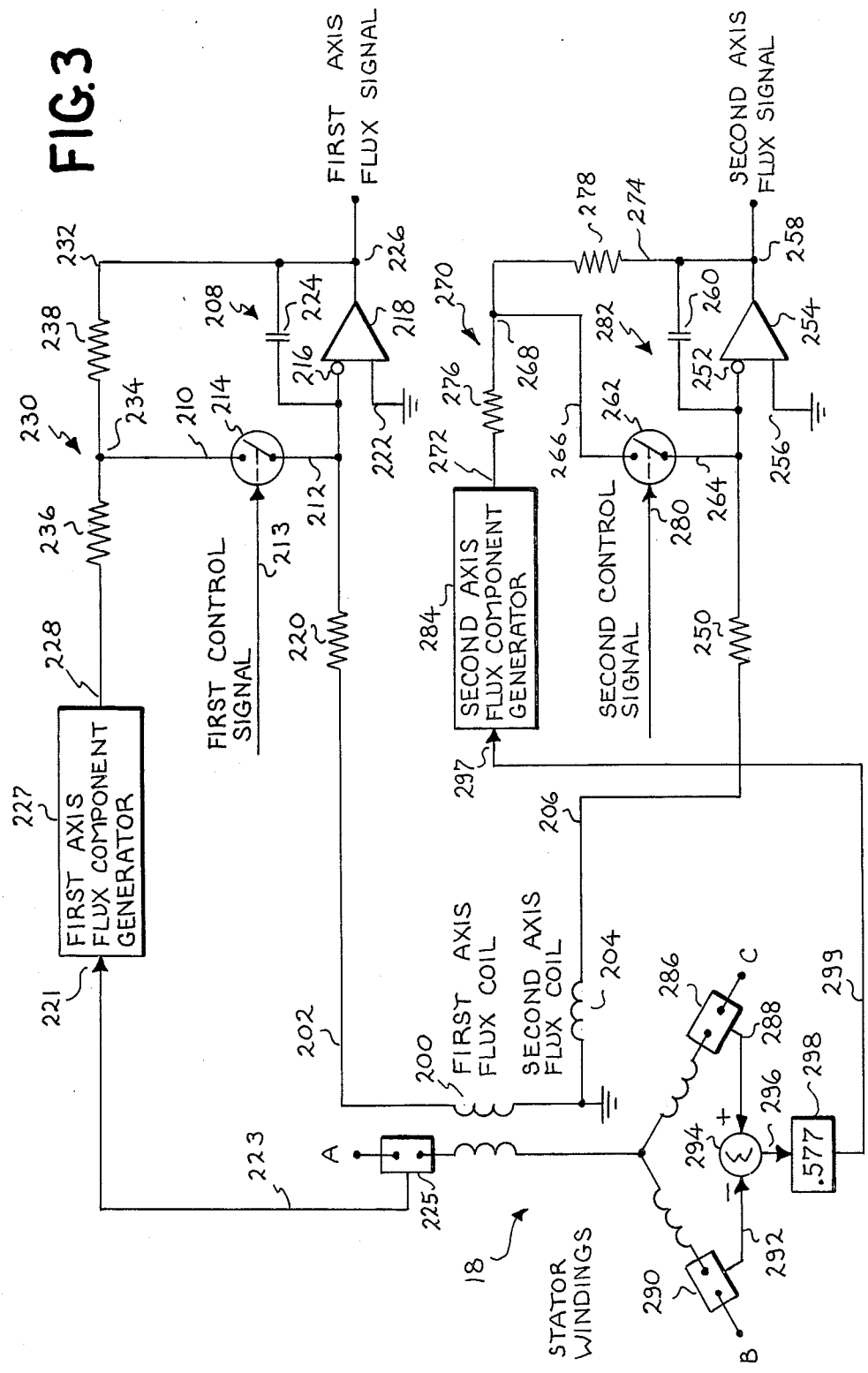
FIG. 3 is a block diagram of an embodiment of the apparatus and method of the present invention for providing a first axis flux signal and a second axis flux signal indicative of the first axis flux and the second axis flux, respectively, of an AC motor which can be stopped in any position in accordance with any valid conduction state of the inverter supplying the drive current when the frequency of the drive current is below the preselected value, where flux coils are providing respective rate of change of motor flux signals.

Turning to FIG. 3, an embodiment of the generalized case of the apparatus and method of the present invention is shown for providing a first axis flux signal and a second axis flux signal respectively indicative of a first axis flux and of a second axis flux in an AC electric motor even when the motor flux is a DC flux. To summarize, the method and apparatus of the present invention in this embodiment provides a first signal proportional to the rate of change of the flux in the motor. A second signal is supplied proportional to the current magnitude of the drive current driving the AC electric motor. The flux signal is generated proportional to the integral of the first signal when the frequency of the drive current is above a preselected value and proportional to the second signal when the frequency of the drive current is below the preselected value.

Referring again to FIG. 3, a first axis flux coil 200 is physically mounted with respect to the stator windings of motor 18 so as to furnish an output or first signal at a terminal 202 whose voltage is proportional to the rate of change of the flux in a first axis. Thus, the first axis flux coil 200 defines the first axis of the motor. For example, the first axis flux coil 200 can be mounted so as to be parallel with respect to the axis of the stator winding A of the motor 18. In such a case, the first axis would coincide with the axis of winding A.

A second axis flux coil 204 is mounted with respect to the stator windings of motor 18 so as to provide an output or third signal on a terminal 206 whose voltage is proportional to the rate of change of flux in a second axis of the motor. The physical orientation of the flux coils 200 and 204, for example, can be substantially orthogonal so that they provide respective first axis and second axis rate of change of flux signals. Alternatively, flux coil 200 can define a first axis and flux coil 204 can define a second axis which are not orthogonal with respect to each other.

The first axis rate of change of flux signal at terminal 202 is integrated by an integrator, designated generally by reference numeral 208, when the frequency of the drive current is above a preselected frequency value. The preselected frequency value is typically a value below which the integrator 208 would not be able to maintain the value of the first axis flux signal due to integrator drift over a substantial time period. For example, the preselected value can be less than or equal to 3 Hz in a 60 Hz system. A representative value for the preselected value of the frequency is 0.5 Hz.

A first control signal is generated, for example, when the integrator 208 would not be able to maintain the value of the first axis flux signal due to integrator drift over a substantial time period. There are many parameters that can be sensed to indicate when this condition has occurred. For example, the first control signal can be generated when the frequency of the drive current is below the preselected frequency value. Another approach is to generate the first control signal when the motor 18 is producing substantially zero rotation at substantially zero torque. A further approach is to furnish the first control signal when the torque produced by motor 18 is below a preselected torque value and the frequency of the drive current is below the preselected frequency value. An additional approach in an AC motor drive employing a desired level of rotation is to generate the first control signal when the torque command signal and at least two of the rotation reference signal, actual rotation signal and rotation difference signals are less than respective predetermined values. This is the approach used in the embodiment of the apparatus and method of the present invention shown in FIG. 7 discussed below and is the subject matter of copending U.S. patent application Ser. No. 032,855, entitled "Zero Rotation and Zero Torque Detector For An AC Electric Motor Drive," by Loren H. Walker and John H. Cutler, which application was filed on the even date therewith, is assigned to the assignee of the present invention, and which is incorporated hereto. A further approach in an AC electric motor drive employing a desired level of torque is to furnish the first control signal when the actual rotation signal and the torque reference signal are less than respective predetermined values. This is the approach used in the embodiment of the apparatus and method of the present invention shown in FIG. 8. It should be noted that the first control signal could alternately be generated by any of the approaches given above when the respective inverse condition occurred so that the presence of the first control signal would indicate that integrator 208 would be able to maintain the value of the first axis flux signal over a substantial time period.

Referring again to FIG. 3, an electronic switch 214 normally does not connect a contact 210 with a contact 212, but is adapted to connect contact 210 with contact 212 when the first control signal is present on a switching input 213. Electronic switch 214 can be of any suitable type, such as a bipolar transistor or field effect transistor switch or an electromechanical relay.

Contact 212 is connected to an inverting input of an operational amplifier 218. Operational amplifier 218 can be of any suitable type of conventional design. The signal at terminal 202 (proportional to the rate of change of the flux in the first axis) is provided via a scaling resistor 220 to the inverting input of an operational amplifier 218. A non-inverting input 222 of operational amplifier 218 is connected to electrical ground. An integrating capacitor 224 is connected between an output 226 of operational amplifier 218 and inverting input 216.

When the first control signal is not being furnished to switching input 213, switch 214 is in the open state, as was stated above. When switch 214 is in the open state, operational amplifier 218 is connected to act as an integrator and provide on output terminal 226 a signal proportional to the integral of the rate of change of the flux in the first axis. In other words, the signal on output terminal 226 is proportional to the first axis flux of motor 18.

The magnitude of the flux in motor 18 is proportional to the current magnitude of the drive current in motor 18 when the torque produced by motor 18 is below a predetermined torque level and the frequency of the drive current is below a preselected value.

Referring again to FIG. 3, a second signal proportional to the component of the drive current that produces a first axis component of flux is provided by a first axis flux component generator 227 discussed below to an input 228 of a signal divider, designated generally by reference numeral 230. Signal divider 230 has an output 232 and a divider output 234. Signal divider 230 can be of any suitable type, but typically employs a resistor 236 connected between the input 228 and the divider output 234 and a resistor 238 connected between the divider output 234 and the output 232. The output 232 is connected to output 226 of operational amplifier 218. The divider output 234 is connected to the terminal 210 of the switch 214. Switch 214 is adapted to be switched to the closed state in response to the first control signal.

First axis flux component generator 227 can be of any suitable type for providing a second signal proportional to the component of the drive current that produces the first axis component of flux. In the present embodiment, the first axis was chosen to coincide with the axis of stator winding A of motor 18. One suitable embodiment for first axis flux component generator 227 utilizes a shunt 225, which is mounted to sense the drive current through winding A and provides on a line 223 a signal proportional to the current magnitude of the drive current through winding A. Shunt 225 can be of any suitable type of conventional design. It should be remembered that the current magnitude of the drive current through winding A is proportional to the component of the drive current that produces the first axis component of flux when the torque produced by motor 18 is below a predetermined torque level and the frequency of the drive current is below a preselected level. Thus, the signal on line 223 is proportional to the second signal when this condition is present.

Line 223 is connected to an input 221 of the first axis flux component generator 227. In the embodiment of FIG. 3, input 221 may be directly connected to input 228 of signal divider 230. Thus, the signal on line 223 is the second signal. Alternately, an amplifier (not shown) of conventional design or an attenuator of convetional design can be interposed in first axis flux component generator 227 between input 221 and input 228 of signal divider 230 to provide scaling of the signal on line 223.

When the first control signal is furnished to switching input 213 of switch 214 causing it to go to the closed state, the second signal proportional to the magnitude of that portion of the drive current that produces the first axis component of flux is effectively provided to inverting input 216 of operational amplifier 218. It should be noted that resistor 238 is connected between the output 226 and inverting input 216 of operational amplifier 218. This circuit configuration causes amlifier 218 to operate as a normal gain amplifier because the integrating effect produced by capacitor 224 is swamped out. Thus, the signal present on the output terminal 226 of operational amplifier 218 is proportional to the second signal when switch 214 is driven to the closed state. Consequently, the signal on output terminal 226 is proportional to the first axis flux when the frequency of the drive current is above or below the preselected value.

It should be observed that operational amplifier 218 is operating as a gain amplifier when switch 214 is caused to be in the closed state. Thus, operational amplifier 218 does not exhibit the drift problems that it would exhibit if it were operating as an integrator when the frequency of the drive current is below the preselected value. Thus, the apparatus and method of the present invention provides a precise measure of motor flux at very low drive current frequencies including DC, provided that the torque produced by the motor is near zero.

The apparatus and method of the present invention of the embodiment shown in FIG. 3 for providing the second axis flux signal is substantially similar to the apparatus and method for providing the first axis flux signal just described. For purposes of illustration, the second axis has been chosen to be substantially orthogonal with respect to the first axis, but the apparatus and method of the present invention of FIG. 3 is equally applicable to situations where this orthogonality is not the case.

The second axis rate of change of flux signal at terminal 206 is integrated by an integrator, designated generally by reference numeral 282, when the frequency of the drive current is above a preselected frequency value. The preselected frequency value is typically a value below which the integrator 282 would not be able to maintain the value of the second axis flux signal due to integrator drift and the like over a substantial time period. A representative value for the preselected value of the frequency is 0.5 Hz.

A second control signal is generated, for example, when the integrator 282 would not be able to maintain the value of the second axis flux signal due to integrator drift and the like over a substantial time period. There are many parameters that can be sensed to indicate when this condition has occurred. For example, the second control signal can be generated when the frequency of the drive current is below the preselected frequency value. Another approach is to generate the second control signal when the motor 18 is producing substantially zero rotation at substantially zero torque. A further approach is to furnish the second control signal when the torque produced by motor 18 is below a preselected torque value and the frequency of the drive current is below the preselected frequency value. An additional approach in an AC motor drive employing a desired level of rotation is to generate the second control signal when the torque command signal and at least two of the rotation reference signal, actual rotation signal and rotation difference signal are less than respective predetermined values. This is the approach used in FIG. 7 discussed below. A further approach in an AC motor drive employing a desired level of torque is to furnish the second control signal when the actual rotation signal and the torque reference signal are less than respective predetermined values. This is the approach used in the embodiment of the apparatus and method of the present invention shown in FIG. 8 below. Other approaches are equally apparent. It should be noted that the second control signal could alternately be generated by any of the approaches given above when the respective inverse condition occurred so that the presence of the second control signal would indicate that integrator 282 would be able to maintain the value of the second axis flux signal over a substantial time period.

Referring again to FIG. 3, an electronic switch 262 normally does not connect a contact 264 with a contact 266, but is adapted to connect contact 264 with contact 266 when the second control signal is present on a switching input 280. Electronic switch 262 can be of any suitable type, such as a bipolar transistor or field effect transistor switch or an electromechanical relay.

Contact 264 is connected to an inverting input 252 of an operational amplifier 254. Operational amplifier 254 can be of any suitable type of conventional design. The signal at terminal 206 (proportional to the rate of change of the flux in the second axis) is provided via a scaling resistor 250 to the inverting input of an operational amplifier 254. A non-inverting input 256 of operational amplifier 254 is connected to electrical ground. An integrating capacitor 260 is connected between an output 258 of operational amplifier 254 and inverting input 252.

When the second control signal is not being furnished to switching input 280, switch 262 is in the open state, as was stated above. When switch 262 is in the open state, operational amplifier 254 is connected to act as an integrator and provide an output terminal 258 a signal proportional to the integral of the rate of change of the flux in the second axis. In other words, the signal on output terminal 258 is proportional to the second axis flux of motor 18.

As stated above, the magnitude of the flux in motor 18 is proportional to the current magnitude of the drive current in motor 18 when the torque produced by motor 18 is below a predetermined torque level and the frequency of the drive current is below a preselected value.

Referring again to FIG. 3, a fourth signal proportional to the component of the drive current that produces the second axis component of flux is provided by a second axis flux component generator 284 discussed below to an input 272 of a signal divider, designated generally by reference numeral 270. Signal divider 270 has an output 274 and a divider output 268. Signal divider 270 can be of any suitable type, but typically employs a resistor 276 connected between the input 272 and the divider output 268 and a resistor 278 connected between the divider output 268 and the output 274. The output 274 is connected to output 258 of operational amplifier 254. The divider output 268 is connected to the terminal 266 of the switch 262. Switch 262 is adapted to be switched to the closed state in response to the second control signal.

Second axis flux component generator 284 can be of any suitable type for providing a fourth signal proportional to the component of the drive current that produces the second axis component of flux. In the present embodiment, the second axis was chosen to be substantially orthogonal with respect to the first axis, which was made to coincide with the axis of stator winding A of motor 18. It should be noted that winding C is displaced approximately 120° in the clockwise direction with respect to winding A and that winding B is displaced approximately 120° in the counterclockwise direction with respect to winding A.

One suitable embodiment for second axis flux component generator 284 utilizes a shunt 286, which is connected to sense the drive current through winding C and provides on a line 288 a signal proportional to the current magnitude of the drive current through winding C. Shunt 286 can be of any suitable type of conventional design. A shunt 290 is mounted to sense the drive current through winding B and provides on a line 292 a signal proportional to the current magnitude of the drive current through winding B. Line 288 is connected as a first input of a summer 294 and line 292 is connected as a second input of summer 294. Summer 294 is of conventional design. The output of summer 294 is provided to an input 296 of an attenuator 298 of conventional design. Attenuator 298 attenuates by a predetermined attentuation amount the signal applied to its input 296, and provides this attenuated signal at an output connected to a line 299. A suitable predetermined attenuation amount for the present case where windings B and C are each displaced 120° in opposite rotations from winding A is 0.577. This predetermined attenuation amount causes the signal on line 299 to be substantially proportional to the component of the drive current that produces the second axis component of flux produced in motor 18. Thus, the signal on line 299 is proportional to the fourth signal. It is apparent that this value for the predetermined attentuation amount would change if the orientation of the second flux axis was changed with respect to windings B and C.

Line 299 is connected to an input 297 of the second axis flux component generator 284. In the embodiment of FIG. 3, input 297 is directly connected to input 272 of signal divider 270. Thus, the signal on line 299 is the second signal. Alternately, an amplifier of conventional design or an attenuator of conventional design can be interposed in second axis flux component generator 284 between input 297 and input 272 of signal divider 270 to provide scaling of the signal on line 299 (not shown).

When the second control signal is furnished to switching input 280 of switch 262 causing it to go to the closed state, the fourth signal proportional to the magnitude of that portion of the drive current that produces the second axis component of flux is effectively provided to inverting input 252 of operational amplifier 254. It should be noted that resistor 278 is connected between the output 258 and inverting input 252 of operational amplifier 254 via switch 262. This circuit configuration causes amplifier 254 to operate as a normal gain amplifier because the integrating effect produced by capacitor 260 is swamped out. Thus, the signal present on the output terminal 258 of operational amplifier 254 is proportional to the fourth signal when switch 262 is driven to the closed state. Consequently, the signal on output terminal 258 is proportional to the second axis flux when the frequency of the drive current is above or below the preselected value.

It should be observed that operational amplifier 254 is operating as a gain amplifier when switch 262 is caused to be in the closed state. Thus, operational amplifier 254 does not exhibit the drift problems that it would exhibit if it was operating as an integrator when the frequency of the drive current was below the preselected value. Thus, the apparatus and method of the present invention provides a precise measure of motor flux at very low drive current frequencies including DC, provided that the torque produced by the motor is near zero.

Figure 4:
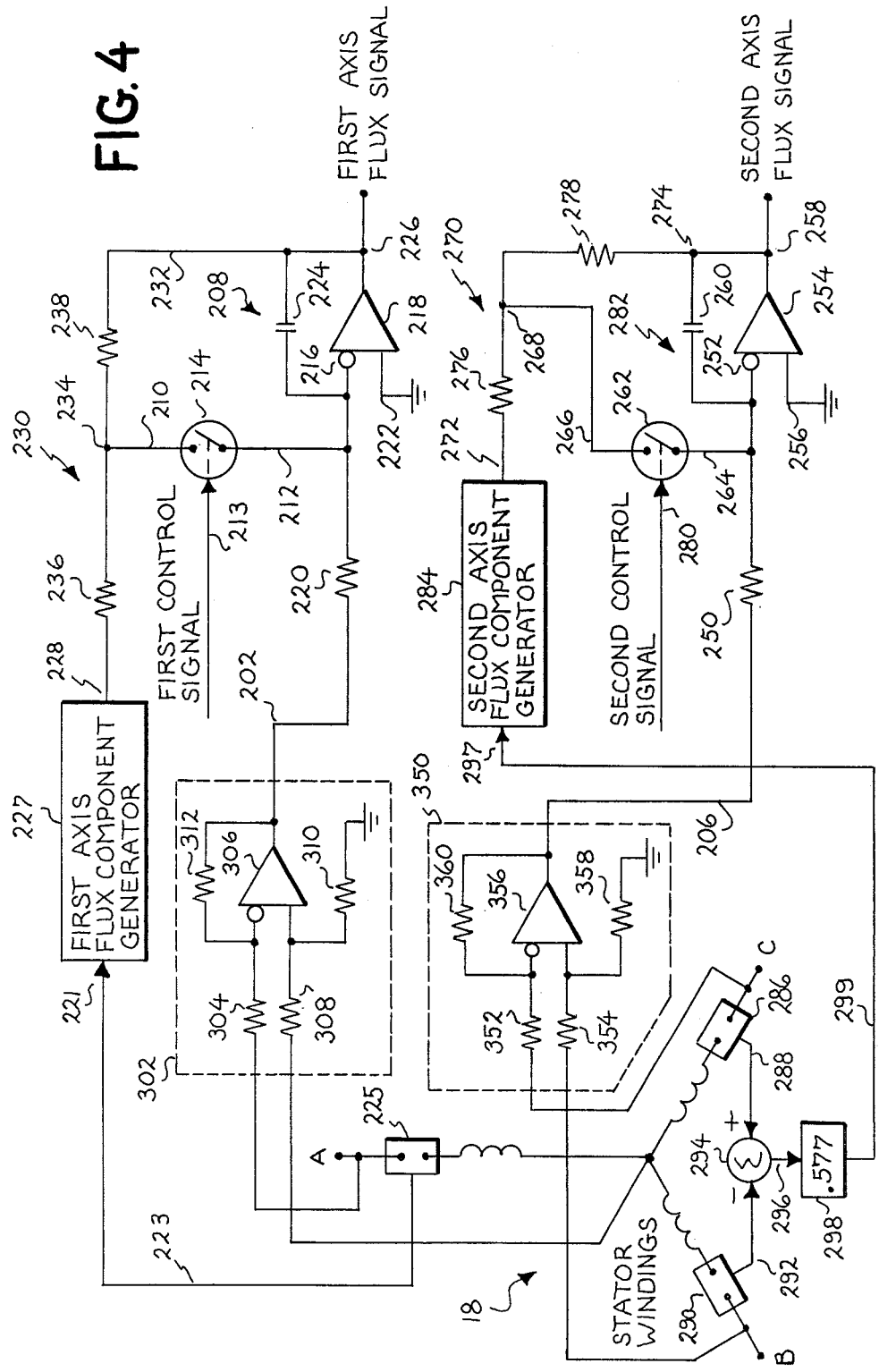
FIG. 4 is identical to the embodiment of FIG. 3 with the exception that terminal voltages are being sensed to provide the respective rate of change of motor flux signals.

Referring now to FIG. 4, an embodiment of the apparatus and method of the present invention is shown where the first axis flux coil 200 and the second axis flux coil 204 have been replaced with circuits which provide the respective first and third signals by sensing the terminal voltages of motor 18. Like number components between FIGS. 3 and 4 correspond to the same components, and these components are not discussed herein in detail. Rather, the components in a dashed-line box 302 and in a dashed-line box 350 are discussed in detail.

Dashed-line box 302 encloses the circuit which replaces the first axis flux coil 200 and provides the first signal proportional to the rate of change of flux in the first axis by sensing the terminal voltages of stator winding A of motor 18. A scaling resistor 304 is connected at one side to the side of winding A opposite the wye connection and at its other side to an inverting input of an operational amplifier 306. Operational amplifier 306 is of conventional design. A scaling resistor 308 is connected at one side to the wye connection of winding A and at its other side to a non-inverting input of operational amplifier 306. A resistor 310 is connected from the non-inverting input of operational amplifier 306 to system ground. Operational amplifier 306 is configured to operate as a gain amplifier by connecting a resistor 312 between its inverting input and its output. The output of operational amplifier 306 is connected to line 202 and provides thereon the first signal.

Dashed-line box 350 encloses the circuit which replaces the second axis flux coil 204 and provides the third signal proportional to the rate of change of flux in the second axis by sensing the terminal voltages of stator windings B and C of motor 18. A scaling resistor 352 is connected at one side to the side of winding C opposite the wye connection and at its other side to an inverting input of an operational amplifier 356. Operational amplifier 356 is of conventional design. A scaling resistor 354 is connected at one side to the side of winding B opposite the wye connection and at its other side to a non-inverting input of an operational amplifier 356. A resistor 358 is connected from the non-inverting input of operational amplifier 356 to system ground. Operational amplifier 356 is configured to operate as a gain amplifier by connecting a resistor 360 between its inverting input and its output. The value of resistors 358 and 360 are selected so that the signal at the output of amplifier 356 is proportional to the rate of change of flux in the second axis. For example, in the embodiment of FIG. 4, resistor 360 can have a value that is approximately 0.577 the value of resistor 312. The output of operational amplifier 356 is connected to line 206 and provides thereon the third signal.

Figure 5:
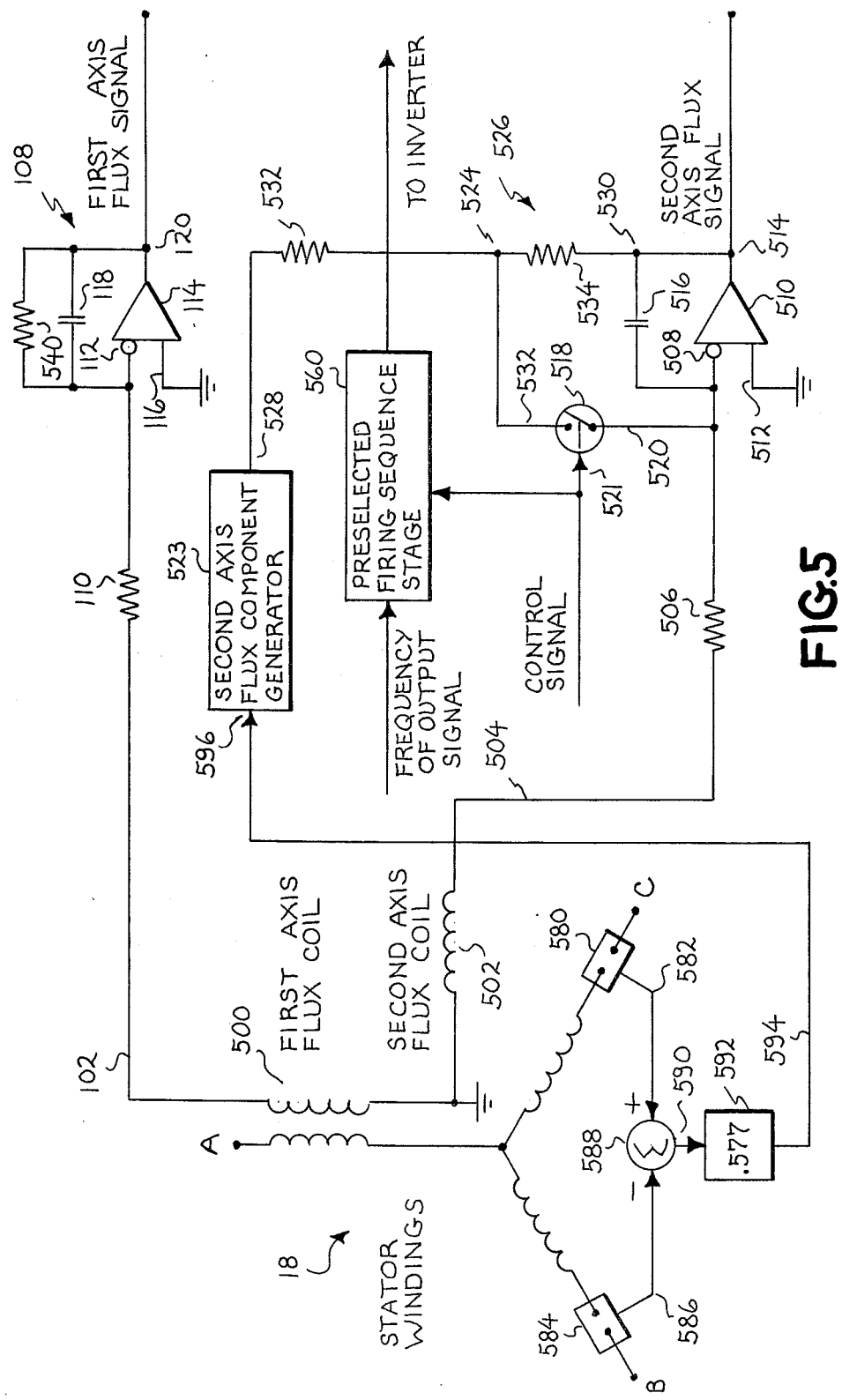
FIG. 5 is a block diagram of another embodiment of the present invention that produces a first axis flux signal and a second axis flux signal indicative of the first axis flux and the second axis flux, respectively, of an AC electric motor that is stopped in a predetermined fixed position in accordance with a predetermined conduction state of the inverter supplying the drive current causing no first axis flux to be produced.

Turning now to FIG. 5, another embodiment of the apparatus and method of the present invention is shown. As stated above, inverter 10 provides the drive current to desired stator windings in motor 18 in accordance with the conduction state of the thyristors in inverter 10. Thus, if the conduction state of the thyristors in inverter 10 is selected so that the drive current is flowing through selected stator windings when the frequency of the drive current is substantially zero, and the flux coils are mounted to detect motor flux so that only one flux coil is needed to detect the flux present when a predetermined conduction state of inverter 10 occurs, then only the integrator connected with that flux coil must be adapted to act as a gain amplifier to produce the desired flux signal. This is the case in the embodiment shown in FIG. 5.

Referring again to FIG. 1, it is shown that the current is flowing through stator windings C to stator winding B of motor 18 when the predetermined conduction state of inverter 10 is present as indicated by the blackened SCR symbols and blocking diode symbols. This is designated herein as the predetermined conduction state for the motor 18 when the frequency of the drive current is below the preselected value and the amount of torque being produced by motor 18 is below a preselected torque value. It should be understood, however, that other predetermined conduction states can be selected if the orientation of the flux coils in motor 18 are changed so that only one flux coil is needed to detect the level of the flux when the predetermined conduction state is present.

Referring again to FIG. 5, a first axis flux coil 500 is mounted to be substantially in phase with winding A of motor 18. A second axis flux coil 502 is mounted to be substantially orthogonal with respect to the first axis flux coil 500 and is responsive to the second axis flux component which is present when the drive current is flowing through winding B and/or winding C.

Referring to the second axis flux coil 502, it is seen that there is no first axis flux present when the drive current is flowing through winding C to winding B because the first axis flux component produced by winding C is cancelled out by the first axis flux component produced by winding B. Thus, if a predetermined conduction state is selected so that the drive current only flows through winding C to winding B when the frequency of the drive current is below the preselected value, only the apparatus and method of the present invention associated with the second axis flux coil 502 must be adapted to change from an integrator to a gain amplifier to produce the desired second axis flux signal. The preselected frequency value can be less than or equal to 3 Hz in a 60 Hz system. Another practical value for the preselected value of the frequency is 0.5 Hz.

A control signal is generated, for example, when the integrator for the second axis flux would not be able to maintain the value of the second axis flux signal due to integrator drift over a substantial time period. There are many parameters that can be sensed to indicate when this condition has occurred. For example, the control signal can be generated when the frequency of the drive current is below the preselected frequency value. Another approach is to generate the control signal when the motor 18 is producing substantially zero rotation at substantially zero torque. A further approach is to furnish the control signal when the torque produced by motor 18 is below a preselected torque value and the frequency of the drive current is below the preselected frequency value. An additional approach in an AC motor drive employing a desired level of rotation is to generate the control signal when the torque command signal and at least two of the rotation reference signal, actual rotation signal and rotation difference signal are less than respective predetermined values. This is the approach used in the embodiment of the apparatus and method of the present invention shown in FIG. 7 discussed below. A further approach in an AC motor drive employing a desired level of torque is to furnish the control signal when the actual rotation signal and the torque reference signal are less than respective predetermined values. This is the approach used in the embodiment of the apparatus and method of the present invention shown in FIG. 8 below. It should be noted that the control signal could alternately be generated by any of the approaches given above when the respective inverse condition occurred so that the presence of the control signal would indicate that the integrator would be able to maintain the value of the second axis flux signal over a substantial time period.

Referring again to FIG. 5, an electronic switch 518 normally does not connect a contact 520 with a contact 532, but is adapted to connect contact 520 with contact 532 when the control signal is present on a switching input 521. Electronic switch 518 can be of any suitable type, such as bipolar transistor or field effect transistor switch or an electromechanical relay.

Contact 520 is connected to an inverting input 508 of an operational amplifier 510. Operational amplifier 510 can be of any suitable type of conventional design. The second axis rate of change of flux signal present at a terminal 504 of second axis flux coil 502 is provided via a scaling resistor 506 to the inverting input 508 of an operational amplifier 510. The non-inverting input 512 of operational amplifier 510 is connected to electrical ground. An output 514 of operational amplifier 510 is connected via an integrating capacitor 516 to the inverting input. Thus, when switch 518 is in the open state, operational amplifier 510 is in an integrator configuration and produces the second axis flux signal on output terminal 514, which is proportional to the integral of the second axis rate of change of flux signal supplied by second axis flux coil 502.

A signal proportional to the magnitude of that portion of the drive current that produces the second axis component of the motor flux is provided to an input 528 of a signal divider, designated generally by the reference numeral 526. A second axis flux component generator 523 provides the signal proportional to the magnitude of that portion of the drive current that produces the second axis component of the motor flux. The second axis flux component generator 523 can be of any suitable type for providing a signal proportional to the component of the drive current that produces the second axis component of flux. In the present embodiment of FIG. 5, the second axis was chosen to be substantially orthogonal with respect to the first axis, which first axis was made to coincide with the axis of stator winding A of motor 18. It should be noted that winding C is displaced approximately 120° in the clockwise direction with respect to winding A and that winding B is displaced approximately 120° in the counterclockwise direction with respect to winding A.

One suitable embodiment for second axis flux component generator 523 utilizes a shunt 580, which is connected to sense the drive current through winding C and provides on a line 582 a signal proportional to the current magnitude of the drive current through winding C. Shunt 580 can be of any suitable type of conventional design. A shunt 584 is mounted to sense the drive current through winding B and provides on a line 586 a signal proportional to the current magnitude of the drive current through winding B. Line 582 is connected to a non-inverting input of a summer 588 and line 586 is connected to an inverting input of summer 588. Summer 588 is of conventional design. The output of summer 588 is provided to an input 590 of the attenuator 592 of conventional design. Attenuator 592 attenuates by a predetermined attenuation amount the signal applied to its input 590 and provides this attenuated signal at an output connected to a line 594. A suitable predetermined attenuation amount for the present case where windings B and C are each displaced 120° in opposite rotations from winding A is 0.577. This predetermined attenuation amount causes the signal on line 594 to be substantially proportional to the component of the drive current that produces the second axis component of flux produced in motor 18. It is apparent that this value for the predetermined attenuation amount would change if the orientation of the second flux axis were changed with respect to windings B and C.

Line 594 is connected to an input 596 of the second axis flux component generator 523. In the embodiment of FIG. 5, input 596 is directly connected to input 528 of signal divider 526. Alternatively, an amplifier (not shown) of convention design or an attenuator of conventional design can be interposed in second axis flux component generator 523 between input 596 and input 528 of signal divider 526 to provide scaling of the signal on line 594.

As an additional alternate method, second axis flux component generator 523 may consist of a fixed voltage reference. In the case under consideration in which the inverter is stopped in a predetermined conduction state, if the current level is also forced by the control to a fixed idle current level when switch 518 is closed, then the magnitude of the motor current is known and need not be measured. In this case, the signal required at line 528 is a constant and can be provided by a fixed reference, for example, through the use of a resistive voltage divider.

An output 530 of signal divider 526 is connected to output 514 of operational amplifier 510. Signal divider 526 can be of any suitable type. For example, a resistor 532 can be provided between input 528 and a divider output 524, and a resistor 534 can be provided between divider output 524 and output 530.

When the control signal is present at switching input 521, electronic switch 518 is caused to go to the closed state. The signal proportional to the magnitude of that portion of the drive current that produces the second axis component of flux on line 528 is effectively provided to inverting input 508 of operational amplifier 510. It should be noted that switch 518 when closed also causes resistor 534 to be connected between the inverting input 508 and the output 514 of operational amplifier 510. Resistor 534 swamps out capacitor 516 and causes operational amplifier 510 to operate as a gain amplifier.

The control signal also causes a predetermined firing sequence stage 560 to cause inverter 10 to provide a drive current to motor 18 which produces flux having only a second axis component. For example, predetermined firing sequence stage 560 can cause inverter 10 to cycle through and provide a drive current to motor 18 which flows through winding C to winding B of motor 18. Predetermined firing sequence stage 560 can be of any suitable type. One suitable form for predetermined firing sequence stage 560 is that of a voltage controlled oscillator, non-recirculating shift register and associated control circuitry disclosed and claimed in U.S. Patent Application Ser. No. 032,894, entitled "Fixed Gating Sequence Apparatus and Method for an Inverter," to John H. Cutler et al, filed on the same day as the present application, assigned to the assignee of the present application, and incorporated herein by reference.

Thus, when the control signal is present, the output signal on output 514 is the second axis flux signal, which is a measure of the level of the second axis flux of motor 18 at very low drive current frequencies including DC, as long as the torque produced by the motor is below a predetermined torque value.

The circuitry of the embodiment of FIG. 5 for providing the first axis flux signal is identical to the circuitry of the conventional apparatus of FIG. 2 for providing the first axis flux signal with the exception of the addition of resistor 540 in the embodiment of FIG. 5.

Like numbered components between FIGS. 5 and 2 correspond to the same components, and these like numbered components are not discussed herein. The resistor 540 is connected between the inverting input 112 and the output 120 of operational amplifier 114.

When motor 18 is stopped in a fixed position corresponding to the predetermined conduction state of inverter 10, the motor flux in the first axis is zero. Consequently, the first axis rate of change of flux component is also zero. The output of operational amplifier 114 absent resistor 540 will be an accurate representation of the first axis flux for long periods of time only if operational amplifier 114 has no drift or offset. Resistor 540, which has a large ohmic value, may be added to maintain the output of operational amplifier 114 at zero volts in the absence of an input signal on terminal 102. By using, for example, a very large ohmic value for resistor 540, operational amplifier 114 can operate as an ideal integrator down to very low drive current frequencies, e.g., less than 1 Hz., and still have only a small spurious output due to DC offset and drift.

It should be noted that the first and second axes of the embodiment of the present invention of FIG. 5 can be rotated or reversed with respect to each other as long as the DC flux component is caused only to be in the axis sensed by the circuitry associated with operational amplifier 510.

Figure 6:
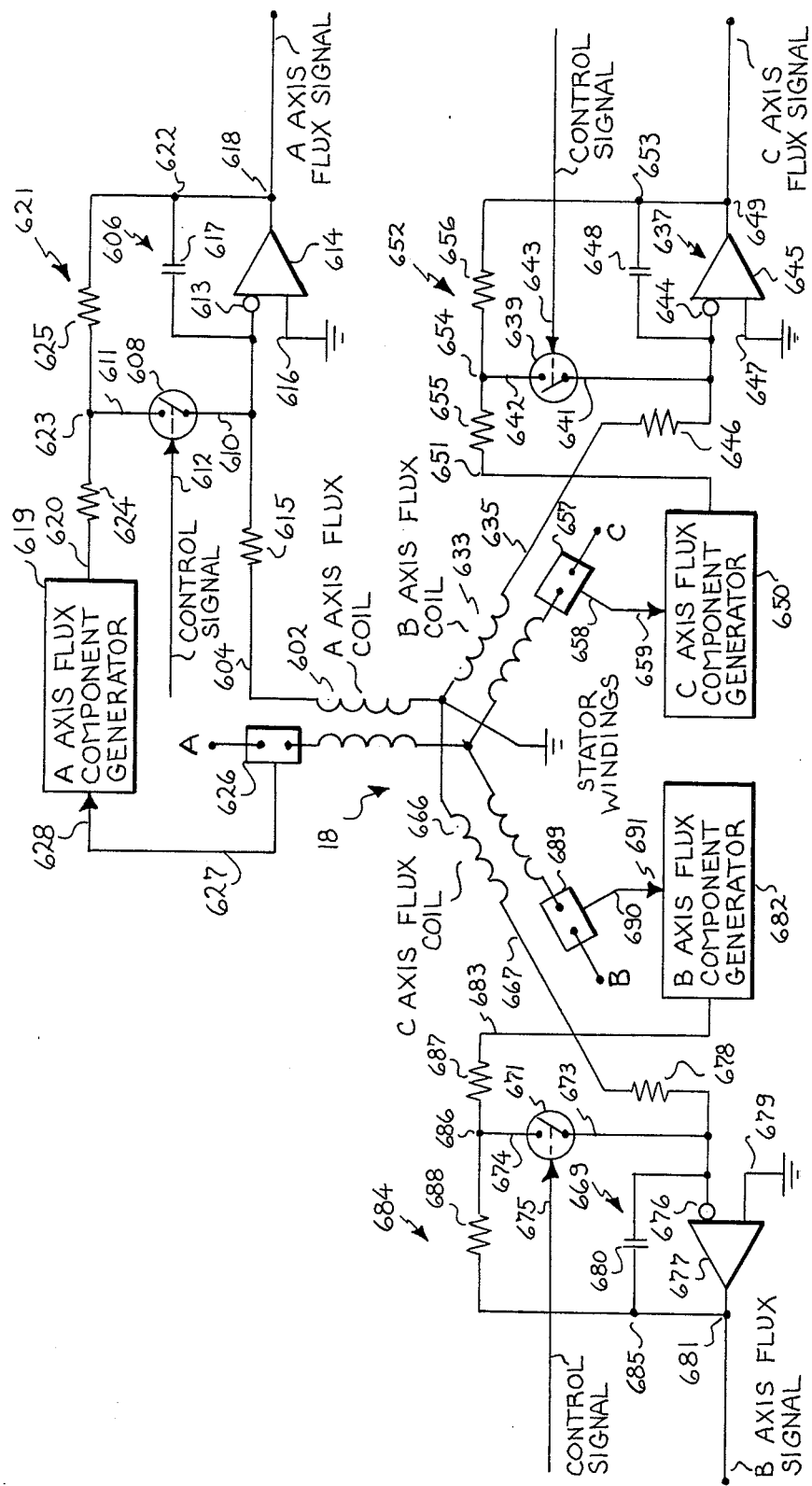
FIG. 6 is a block diagram of another embodiment of the present invention that produces an A axis flux signal, a B axis flux signal and a C axis flux signal indicative of the A axis flux, B axis flux and C axis flux, respectively, of an AC electric motor which can be stopped in any position in accordance with any valid conduction state of the inverter supplying the drive current when the frequency of the drive current is below the preselected value, where flux coils are providing respective rate of change of motor flux signals.

FIG. 6 shows an embodiment of the apparatus and method of the present invention which provides output signals which are precise measures respectively of the A axis flux, B axis flux and C axis flux of a three-phase motor 18 having stator windings A, B and C. The circuitry for each axis of the embodiment of FIG. 6 corresponds to the circuitry associated with stator winding A of motor 18 shown in FIG. 3. It should also be understood that the flux coils used by the circuitry of FIG. 6 for stator windings A, B and C, respectively, can be removed and the terminal voltages of the respective stator windings can be measured in lieu therefor in the manner shown with the circuitry associated with stator winding A of motor 18 of the embodiment of FIG. 4.

Because the circuitries of FIG. 6 for providing a flux signal indicative of the motor stator winding being sensed are identical and are also identical to the circuitry associated with stator winding A of motor 18 of FIG. 3 (and for the case where terminal volts are sensed by the circuitry associated with stator winding A of motor 18 of FIG. 4), only a brief explanation for the circuitry associated with stator winding A of FIG. 6 is discussed below. This discussion is equally applicable to the circuitries associated with stator windings B and C of the embodiment of FIG. 6.

Before discussing the embodiment of FIG. 6 in detail, it should be noted that the apparatus and method of the present invention contemplates providing a circuit and method of providing a flux signal of any stator winding or flux axis of an AC electric motor and is not limited to three-phase motors or a maximum of three axes. Four or more phases or axes are contemplated. Nor do the axes being sensed have to be spaced substantially equally with respect to each other. It is only for purposes of illustration that stator windings A, B and C of the embodiment of FIG. 6 are spaced at 120° intervals with respect to each other.

An A axis flux coil 602 is mounted to sense the A axis rate of change of flux in motor 18 and to provide, on a line 604, the A axis rate of change of flux signal. The signal on line 604 is integrated by an integrator designated generally by reference numeral 606, when the frequency of the drive current is above a preselected frequency value. The preselected frequency value is typically a value below which the integrator 606 would not be able to maintain the value of the A axis flux signal due to integrator drift and the like over a substantial time period. The preselected value, for example, can be less than or equal to 3 Hz for a 60 Hz system. Another practical value for the preselected value of the frequency is 0.5 Hz.

A control signal is generated, for example, when integrator 606 would not be able to maintain the value of the A axis flux signal due to integrator drift and the like over a substantial time period. There are many parameters that can be sensed to indicate when this condition has occurred. For example, the control signal can be generated when the frequency of the drive current is below the preselected frequency value. Another approach is to generate the control signal when motor 18 is producing substantially zero rotation at substantially zero torque. A further approach is to furnish the control signal when the torque produced by motor 18 is below a preselected torque value and the frequency of the drive current is below the preselected frequency value. An additional approach in an AC motor drive employing a desired level of rotation is to generate the control signal when the torque command signal and at least two of the rotation reference signal, actual rotation signal and rotation difference signal are less than respective predetermined values. This is the approach used in the embodiment of the apparatus and method of the present invention shown in FIG. 7 discussed below. A further approach in an AC motor drive employing a desired level of torque is to furnish the control signal when the actual rotation signal and the torque reference signal are less than respective predetermined values. This is the approach used in the embodiment of the apparatus and method of the present invention shown in FIG. 8 below. Other approaches are equally apparent. It should be noted that the control signal could alternately be generated by any of the approaches given above when the respective inverse condition occurred so that the presence of the control signal would indicate that integrator 606 would be able to maintain the value of the A axis flux signal over a substantial time period.

Referring again to FIG. 6, an electronic switch 608 normally does not connect a contact 610 with a contact 611, but is adapted to connect contact 610 with contact 611 when the control signal is present on a switching input 612. Electronic switch 608 can be of any suitable type, such as a bipolar transistor or field effect transistor switch or an electromechanical relay.

Contact 610 is connected to an inverting input 613 of an operational amplifier 614. Operational amplifier 614 can be of any suitable type of conventional design. The signal on line 604 (proportional to the rate of change of the flux in the A axis) is provided via a scaling resistor 615 to the inverting input 613 of an operational amplifier 614. A non-inverting input 616 of operational amplifier 614 is connected to electrical ground. An integrating capacitor 617 is connected between an output 618 of operational amplifier 614 and inverting input 613.

When the control signal is not being furnished to switching input 612, switch 608 is in the open state, as was stated above. When switch 608 is in the open state, operational amplifier 614 is connected to act as an integrator and provide on output terminal 618 a signal proportional to the integral of the rate of change of the flux in the A axis.

As stated above, the magnitude of the flux in motor 18 is proportional to the current magnitude of the drive current in motor 18 when the torque produced by motor 18 is below a predetermined torque level and the frequency of the drive current is below a preselected value.

Referring again to FIG. 6, a signal proportional to the component of the drive current that produces the A axis component of flux is provided by an A axis flux component generator 619, discussed below, to an input 620 of a signal divider, designated generally by reference numeral 612. Signal divider 621 has an output 622 and a divider output 623. Signal divider 621 can be of any suitable type, but typically employs a resistor 624 connected between the input 620 and the divider output 623 and a resistor 625 connected between the divider output 623 and the output 622. The output 622 is connected to output 618 of operational amplifier 614. The divider output 623 is connected to the terminal 611 of the switch 608. Switch 608 is adapted to be switched to the closed state in response to the control signal.

A axis flux component generator 619 can be of any suitable type for providing a signal proportional to the component of the drive current that produces the A axis component of flux. In the present embodiment, the A axis was chosen to coincide with the axis of stator winding A of motor 18. One suitable embodiment for A axis flux component generator 619 utilizes a shunt 626, which is connected to sense the drive current through winding A and provides on a line 627 a signal proportional to the extant magnitude of the drive current through winding A. Shunt 626 can be of any suitable type of conventional design. It should be remembered that the extant magnitude of the drive current through winding A is proportional to the component of the drive current that produces the A axis component of flux when the torque produced by motor 18 is below a predetermined torque level and the frequency of the drive current is below a preselected level.

Line 627 is connected to an input 628 of the A axis flux component generator 619. In the embodiment of FIG. 6, input 628 is directly connected to input 620 of signal divider 621. Alternately, an amplifier of conventional design or an attenuator of conventional design can be interposed in A axis flux component generator 619 between input 628 and input 620 of signal divider 621 to provide scaling of the signal on line 627.

When the control signal is furnished to switching input 612 of switch 608 causing it to go to the closed state, the signal proportional to the magnitude of that portion of the drive current that produces the A axis component of flux is effectively provided to inverting input 613 of operational amplifier 614. It should be noted that resistor 625 is connected between the output 618 and inverting input 613 of operational amplifier 614. This circuit configuration causes operational amplifier 614 to operate as a normal gain amplifier because the integrating effect produced by capacitor 617 is swamped out. Thus, the signal present on the output terminal 618 of operational amplifier 614 is proportional to the A axis flux signal when switch 608 is driven to the open or the closed state.

It should be observed that operational amplifier 614 is operating as a gain amplifier when switch 608 is caused to be in the closed state. Thus, operational amplifier 614 does not exhibit the drift problems that it would exhibit if it was operating as an integrator when the frequency of the drive current was below the preselected value. Thus, the apparatus and method of the present invention provides a measure of motor flux at very low drive current frequencies including DC, as long as torque produced by the motor is near zero.

As stated above, the components is dashed-line box 302 (FIG. 4) can be used in lieu of the A axis flux coil 602 if the terminal voltages of stator winding A are being sensed to provide the rate of change of the A axis flux signal.

The circuitry to provide the B axis flux signal and the circuitry to provide the C axis flux signal are identical to the circuitry to provide the A axis flux signal with the exception that the respective flux coils have difference orientation. Specifically, flux coils 633 and 666 correspond to flux coil 602. Lines 635 and 667 correspond to the line 604. Integrators 637 and 669 correspond to integrator 606. Electronic switches 639 and 671 correspond to electronic switch 608. Contacts 641 and 673 correspond to contact 610. Contacts 642 and 674 correspond to contact 611. Switching inputs 643 and 675 correspond to switching input 612. Inverting inputs 644 and 676 correspond to inverter input 613. Operational amplifiers 645 and 677 correspond to operational amplifier 614. Scaling resistors 646 and 678 correspond to scaling resistor 615. Non-inverting inputs 647 and 679 correspond to non-inverting input 616. Integrating capacitors 648 and 680 correspond to integrating capacitor 617. Outputs 649 and 681 correspond to output 618. Flux component generators 650 and 682 correspond to flux component generator 619. Inputs 651 and 683 correspond to input 620. Signal dividers 652 and 684 correspond to signal divider 621. Outputs 653 and 685 correspond to output 622. Divider outputs 654 and 686 correspond to divider output 623. Resistors 655 and 687 correspond to resistor 624. Resistors 656 and 688 correspond to resistor 625. Shunts 657 and 689 correspond to shunt 626. Lines 658 and 690 correspond to line 627. And finally, inputs 659 and 691 correspond to input 628.

The present invention has particular applicability for use in an AC electric motor drive system employing an inverter to provide a drive current of variable magnitude and frequency to an AC electric for producing a controllable rotation and torque.

Figure 7:
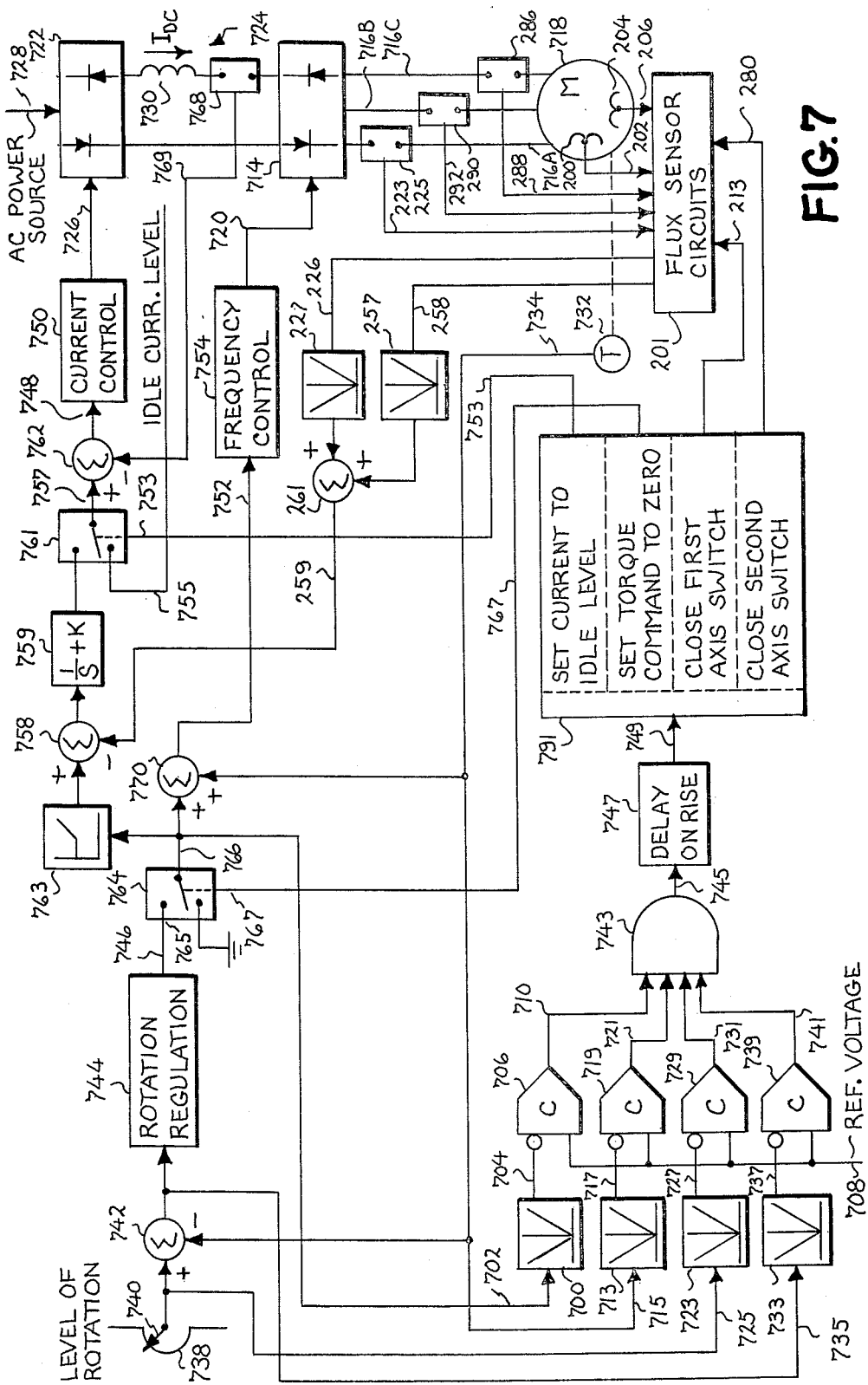
FIG. 7 is a block diagram of an AC motor drive system employing a desired level of rotation in which the apparatus and method of the present invention is employed to control the generation of the drive current supplied to the AC motor.

FIG. 7 is a schematic block diagram of a suitable AC motor drive system in which the apparatus and method for providing a signal proportional to a DC flux in an AC motor of the present invention can be used. The embodiment of the present invention of FIG. 3 is utilized for purposes of illustration, and like numbers correspond to like components between FIGS. 3 and 7. These components are not discussed in detail herein. The remaining circuitry comprises an AC motor drive system employing a desired level of rotation command and is discussed.

The apparatus and method of the present invention can be utilized in other types of electric drive systems. The system shown in FIG. 7 is only for purposes of illustration, and is similar to the system disclosed and claimed in U.S. Pat. No. 4,088,934, entitled "Means for Stabilizing an A-C Electric Motor Drive System," by J. D'Atre et al, issued May 9, 1978, which patent is specifically incorporated herein by reference, and assigned to the assignee of the present invention.

Referring to FIG. 7, a variable frequency inverter 714 provides the drive current of variable magnitude and frequency via lines 716A, 716B and 716C to a load, such as AC motor 718. Shunt 225 is mounted to sense the current magnitude of the drive current on line 716A and to provide a signal proportional thereto on line 223. Shunt 290 is mounted to sense the current magnitude of the drive current on line 716B and to provide a signal proportional thereto on line 292. Shunt 286 is mounted to sense the current magnitude of the drive current on line 716C and to provide a signal proportional thereto on line 288. Lines 223, 292 and 288 are connected to the flux sensor circuits 201 of the present invention.

AC motor 718 can be of any suitable type, but preferably is an AC induction motor. A first axis flux coil 200 is mounted in motor 718 and provides a first axis rate of change of motor flux signal on line 202. A second axis flux coil 204 is mounted in motor 718 and provides a second axis rate of change of motor flux signal on line 206.

Inverter 714 can be of any suitable type for converting a DC input signal to a drive current of variable frequency under control of a frequency control signal on an input line 720. One preferable form for inverter 714 is an autosequentially commutated controlled current inverter having a 6-thyristor bridge, which generates the drive current of variable magnitude and frequency in accordance with the controlled gating of the thyristors. Inverter 714 can be of the type shown in FIG. 1.

The DC input current to inverter 714 can be provided by any suitable variable DC current source. One preferred embodiment for the variable DC current source is a converter 722, which supplies variable magnitude DC current $I_{DC}$ via a DC link 724 to the input of inverter 714. Converter 722 converts AC power supplied through terminals 728 under control of phase controlled gating signals on lines 726 to a DC current of variable magnitude. The phase controlled gating signals are also referred to herein as the current control signal. Converter 722 can by of any suitable type but, most typically, would be a 6-thyristor phase controlled converter whose thyristors are provided with gating pulses by the current control signal on line 726, as shown by converter 722 of FIG. 7.

The DC current of variable magnitude ($I_{DC}$) is provided to inverter 714 via DC link 724. DC link 724 can take any suitable form, but preferably includes an inductor 730 connected in series between converter 722 and inverter 714. Inductor 730 acts as a filter.

Thus, the magnitude of the drive current supplied by inverter 714 to lines 716A-716C is controlled by the current control signal supplied to converter 722, and the frequency of the drive current is varied in accordance with the frequency control signal furnished on line 720 to inverter 714.

The electric motor drive system shown in FIG. 7 is a closed loop system having the following feedback paths. The actual rotation produced by motor 718 is sensed and used to generate an actual rotation signal on line 734 proportional to the mechanical rotation. One suitable form for generating the actual rotation signal is a DC tachometer 732. Other approaches for generating the actual rotation signal are contemplated by this invention.

A desired level of rotation is used to establish a rotation reference signal proportional thereto. The desired level of rotation can be furnished from either a system or user command; and most typically is in the form of a rotation user command from an operator settable rheostat 738 having a wiper arm 740 connected to a user or operator rotation control lever (not shown).

The rotation reference signal from wiper arm 740 is provided to a first input of a summing junction 742. The actual rotation signal is negatively fed back and provided to a second input of summing junction 742. The output of summing junction 742 is a rotation difference signal, which is representative of any difference between the rotation reference signal and the actual rotation signal and is provided to the input of a rotation regulator 744. Rotation regulator 744 can be of any suitable type to generate on a line 746 a torque command signal as a function of the rotation difference signal. One suitable form for rotation regulator 744 is an operational amplifier configured to operate as a gain amplifier having, for example, a transfer function of $k(1+st)/s$, where s is a LaPlace operator, t is a time constant, and k is a gain constant.

Line 746 is connected to the input 765 of an electronic switch 764. Electronic switch 764 is adapted to connect its output 766 effectively to electrical ground in response to a switching signal or idle control signal applied to a switching input 767 so as to cause the torque command signal effectively to assume a substantially zero value. Electronic switch 764 can be of any suitable type, such as a bipolar transistor or field effect transistor switch or an electromechanical relay.

The torque command signal is applied via switch 764 to the input of a limiter stage 763 of conventional design. Limiter 763 prevents the torque command signal from dropping below a predetermined minimum limit, and this signal is applied to an input of a summer 758 of conventional design. The first axis flux signal from output 226 and the second axis flux signal from output 258 of the flux sensor circuits 201 (of the embodiment of the present invention of FIG. 3) are rectified and summed by absolute value circuits 227 and 257 and summing junction 261. The output of summing junction 261 on line 259 is a DC signal proportional to flux magnitude line which is negatively fed back and provided to a second input of summer 758. The output of summer 758 is fed to a conventional gain network 759 having integral plus proportional transfer characteristics, whereby a zero steady-state error can be obtained. In this regard, U.S. Pat. No. 4,088,934 to D'Atre et al is incorporated herein by reference.

The output of gain network 759 is applied via switch 761 to the first input of a summer 762 of conventional design. A shunt 768 is connected to sense the magnitude of the DC current ($I_{DC}$) through inductor 730 connected to inverter 714. Shunt 768 provides on a line 769 a signal indicative of this magnitude level. The signal on line 769 is negatively fed back and provided to a second input of summer 762. The output of summer 762 is applied to the input of a current control 750. Electronic switch 761 normally connects its input to a first output 757, but is adapted to connect its first output 757 to a second input 755 in response to a switch signal or idle control signal applied to a switching input 753. Electronic switch 761 can be of any suitable type, such as a bipolar transistor or field effect transistor switch or an electromechanical relay. When the idle control signal is applied to switching input 753, electronic switch 761 causes an idle current level source to be connected to current control stage 750, via summing junction 762 and hence to a current control stage (discussed below) and effectively causes the magnitude of the drive current to be forced to a predetermined magnitude value.

The output of summer 761 provides to an input 748 of a current control stage 750 a signal representative of the difference between the output signal from output 757 of electronic switch 761 and the signal indicative of the magnitude of the DC current ($I_{DC}$).

Current control stage 750 can be of any suitable type for generating the current control signal on line 726 in accordance with the signal at input 748. One suitable form for current control stage 750 is that of a ramp and pedestal gating control of conventional design.

The torque command signal on line 766 is also applied to the first input of a summer 770 of conventional design. The actual rotation signal is positively fed back and provided to a second input of summer 770. The output of summer 770, which is a signal proportional to the sum of the torque command signal and the actual rotation signal, is provided to the input of input 752 of frequency control stage 754. Frequency control stage 754 can be of any suitable type for generating the frequency control signal as a function of the signal proportional to the sum of the torque command signal and the actual rotation signal. The frequency control signal is provided to inverter 714 via line 720. One suitable form for frequency control stage 754 is that of a voltage controlled oscillator and a non-recirculating shift register disclosed and claimed in U.S. Patent Application Ser. No. 032,895, entitled "Inverter Power Conversion System Having Improved Control Scheme," to Loren H. Walker et al, filed on the even day of the present application, assigned to the assignee of the present application, and incorporated herein by reference. Another suitable form for frequency control stage 754 is that of a voltage controlled oscillator and a ring counter.

The drive system shown in FIG. 7 allows the mechanical rotation and torque generated by AC induction motor 718 to be controlled in accordance with the desired level of rotation.

An idle control signal is furnished in the electric motor drive system of FIG. 7 when the system is in the conventional substantially zero rotation and substantially zero torque mode where the frequency of the drive current is substantially zero. An apparatus and method for furnishing the idle control signal is disclosed in U.S. patent application Ser. No. 032,855, entitled "Zero Rotation and Zero Torque Detector and Method for an AC Electric Motor Drive," to Loren H. Walker and John H. Cutler, filed the same day as the present application, assigned to the assignee of the present invention, and incorporated herein by reference.

Figure 8:
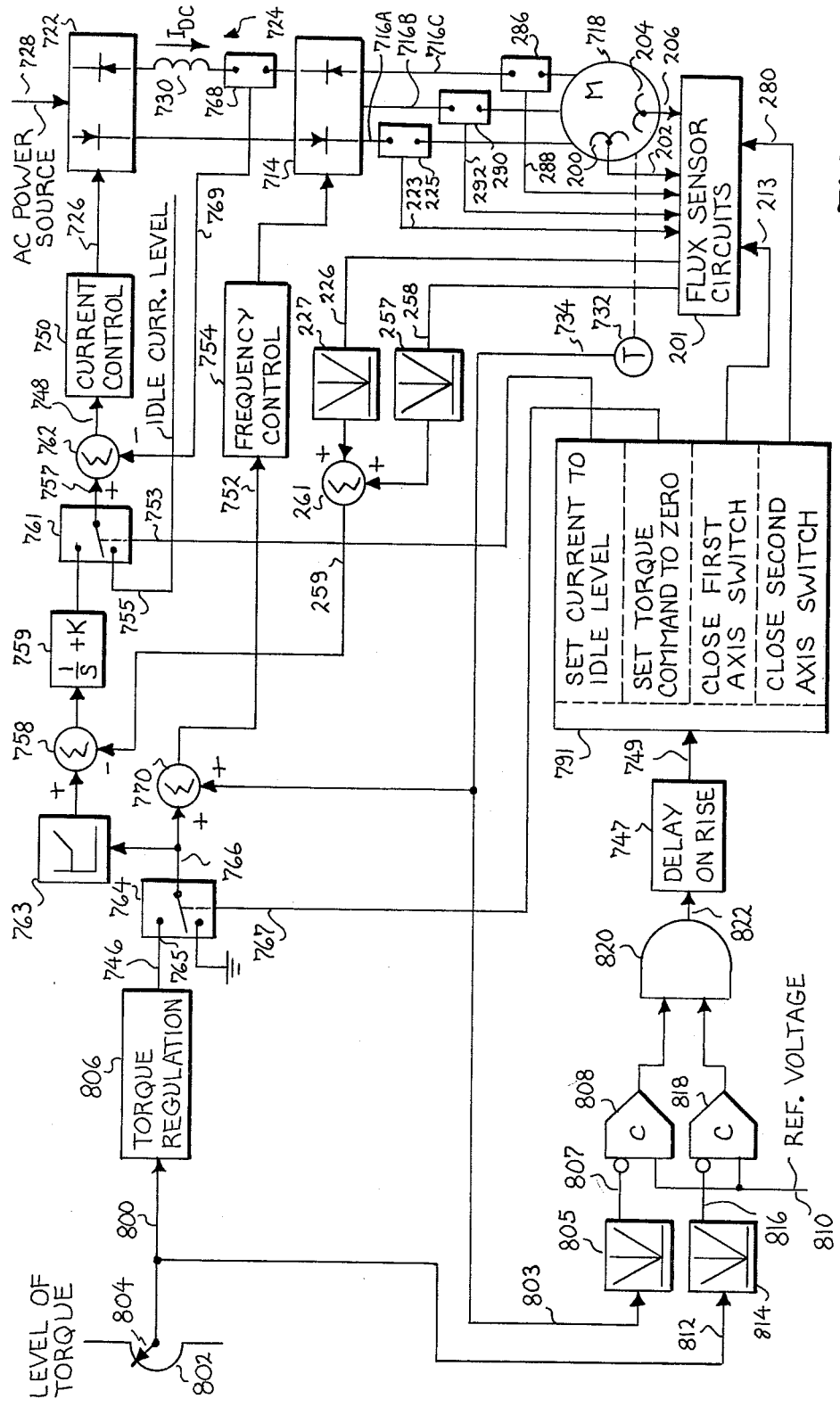
FIG. 8 is a block diagram of an AC motor drive system employing a desired level of torque in which the apparatus and method of the present invention is employed to control the generation of the drive current supplied to the AC motor.

In the case of a drive system utilizing a desired level of rotation, the idle control signal is furnished when the torque reference signal and at least two of the rotation reference signal, the actual rotation signal, and the rotation difference signal are less than respective predetermined values. Alternately, in the case of a drive system utilizing a desired level of torque as shown in FIG. 8, the idle control signal is furnished when the actual rotation signal and the torque reference signal are less than respective predetermined values.

The idle control signal is in the low state when the drive system is not in the substantially zero rotation and substantially zero torque mode, and goes to the high state when the system enters the substantially zero rotation and substantially zero torque condition.

An absolute magnitude circuit 700 has an input connected via line 702 to the torque command signal on line 766. Absolute magnitude circuit 700 can be of any suitable type for providing on an output line 704 an absolute magnitude version of the torque command signal.

The absolute magnitude version of the torque command signal is provided to a first input of a voltage comparator 706, whose second input is connected to a source of reference voltage 708. The level of the reference voltage corresponds to the respective predetermined value below which the absolute magnitude version of the torque command signal must have in order for the system to be in the substantially zero rotation and substantially zero torque mode. Reference voltage source 708 can be of any suitable type for generating a reference voltage at the predetermined value.

Voltage comparator 706 can be of any suitable form for furnishing a first output signal on line 710 when the absolute magnitude version of the torque command signal is less than the level of reference voltage source 708. One suitable form for voltage comparator 706 is that of an operational amplifier connection in the voltage comparison mode.

The input of a second absolute magnitude circuit 713 is connected via a line 715 to the actual rotation signal on line 734 for providing an absolute magnitude version of the actual rotation signal on an output line 717. Absolute magnitude stage 713 can take any suitable form. The absolute magnitude version of the actual rotation signal on line 717 is provided to a first input of a voltage comparator 719. The second input of comparator 719 is connected to reference voltage source 708, and provides at an output 721 a second output signal when the magnitude of the absolute magnitude version of the actual rotation signal is less than the level of reference voltage source 708.

The input of a third absolute magnitude circuit 723 is connected via an input line 725 to the rotation reference signal at wiper arm 740. Absolute magnitude circuit 723 provides at an output line 727 an absolute magnitude version of the rotation reference signal. The absolute magnitude version of the rotation reference signal on output line 727 is supplied to a first input of a voltage comparator 729, whose second input is connected to reference voltage source 708. Comparator 729 provides on an output line 731 a third output signal when the absolute magnitude version of the rotation reference signal is less than the level of the reference voltage signal.

The input of a fourth absolute magnitude circuit 733 is connected via a line 735 to the rotation difference signal at the output of summer 742 for providing an absolute magnitude version of the rotation difference signal on an output line 737. Absolute magnitude stage 733 can take any suitable form. The absolute magnitude version of the rotation difference signal on line 737 is provided to a first input of a voltage comparator 739. The second input of comparator 739 is connected to reference voltage source 708, and provides at an output 741 a fourth output signal when the magnitude of the absolute magnitude version of the rotation difference signal is less than the level of reference voltage source 708.

It should be understood that voltage comparators 706, 719, 729 and 739 each could be connected to a different reference signal source providing reference signals of different levels. The use of different reference sources is one way to provide for different predetermined levels below which the torque command signal and at least two of the rotation reference signal, the actual rotation signal, and the rotation difference signal must be in order for the idle control signal to be furnished.

As shown, the output signals from voltage comparators 706, 719, 729 and 739 on lines 710, 721, 731 and 741, respectively, are applied to a logic circuit 743, which furnishes the idle control signal only when the first control signal and two of the second to fourth control signals are present. It should be understood that the present invention can also be configured to provide the idle control signal when each of the first to fourth control signals are present. Normally, only two of the second to fourth control signals are used, however, because the information in the unused control signal is present in the two control signals that are used. Logic circuit 743 can be of any suitable type, such as an AND or a NAND gate array. The output from logic circuit 743 on line 745 is the idle control signal, and indicates that the drive system is in the substantially zero rotation and substantially zero torque mode of operation.

A delay of predetermined time amount can be introduced before furnishing of the idle control signal to prevent the idle control signal from being generated transiently when the drive system momentarily passes through the substantially zero rotation and substantially zero torque mode. This delay of a predetermined time amount can be produced by applying the idle control signal on line 745 to a delay stage 747. Delay stage 747 has a delay on rise and no delay on fall, for example, 0.1 second on rise.

The idle control signal on output line 749 of delay stage 747 causes, for example, four functions illustrated by a block 791. In lieu of the delay, the idle control signal without delay on line 745 could be provided to block 791.

The first function illustrated by block 791 is to provide a switching signal, i.e., the idle control signal on line 753 to electronic switch 761 effectively to cause the magnitude of the drive current to be rapidly changed to a predetermined magnitude level determined by the predetermined idle current level.

The second function illustrated by block 791 is to provide a switching signal, i.e., the idle control signal, on line 767 to electronic switch 764, causing switch 764 to close so as to reduce rapidly the torque command signal to substantially zero. The reduction of the torque command signal to zero when the drive system is in the substantially zero rotation and substantially zero torque mode prevents sudden transients in drive system performance from occurring when the drive system exits this mode.

The third function illustrated by block 791 is to provide a first idle control signal to line 213 so as to cause the first axis flux circuit of block 201 to switch to the gain amplifier configuration to provide a DC first axis flux signal to line 226.

Finally, the fourth function illustrated by block 791 is to provide a second idle control signal to line 280 so as to cause the second axis flux circuit of block 201 to switch to the gain amplifier configuration to provide a precise DC second axis flux signal to line 258.

Referring to FIG. 8, a preferred embodiment of the apparatus and method of the present invention for use in an AC electric motor drive system employing a desired level of torque command is shown. The AC electric motor drive system of FIG. 8 is similar to the drive system disclosed in the D'Atre et al U.S. Pat. No. 4,088,934, discussed above. Like numbers in FIGS. 7 and 8 correspond to identical components; only different components are discussed herein.

A torque reference signal proportional to a desired level of torque is provided on a line 800. This torque reference signal can be provided by the drive system, or can be furnished by an operator settable rheostat 802 having a wiper arm 804. The position of wiper arm 804 corresponds to the desired level of torque indicated by the position of a user torque lever (not shown).

The torque reference signal is provided as an input of a torque regulator 806, which generates the torque command signal on line 746 as a function of the torque reference signal. Torque regulator 806 can be of any suitable type to generate the torque command signal in accordance with the torque reference signal. One suitable form for torque regulator 806 is an operational amplifier of conventional design configured to operate as an amplifier exhibiting a suitable gain.

In the drive system employing a desired level of torque, the idle control signal is furnished when the torque reference signal and the actual rotation signal are less than respective predetermined values. The respective predetermined values can be different for the torque reference signal and the actual rotation signal.

Referring again to FIG. 8, the actual rotation signal is applied via line 803 to an absolute magnitude circuit 805. Absolute magnitude circuit 805 can be any suitable type for providing on an output line 807 an absolute magnitude version of the actual rotation signal.

The absolute magnitude version of the actual rotation signal is applied to the first input of a voltage comparator 808. A second input of voltage comparator 808 is connected to a reference voltage source 810, which provides a reference signal at a value equal to the respective predetermined value. Voltage comparator 808 provides a second output signal when the absolute magnitude version of the actual rotation signal is less than the predetermined value. Voltage comparator 808 can be of any suitable type, for example, an operational amplifier connected in the voltage comparison mode.

An input line 812 of an absolute magnitude circuit 814 is connected to the torque reference signal present on line 800. Absolute magnitude circuit 814 provides an absolute magnitude version of the torque reference signal on a line 816 connected to the first input of a comparator 818. The second input of voltage comparator 818 is connected to reference voltage source 810. Voltage comparator 818 generates a first output signal when the value of the absolute magnitude version of the torque command signal is less than the reference voltage signal equal to the respective predetermined value furnished by reference voltage source 810. Voltage comparator 818 can be of any suitable type, for example, an operational amplifier connected in the voltage comparison mode.

The first output signal from comparator 818 and the second output signal from voltage comparator 808 are applied to a logic circuit 820, which provides the idle control signal as an output on line 822 when both of the 820 input signals are in the high state. Logic stage 820 can be of any suitable type for providing the idle control signal when each of the two output signals are in the high state, for example an AND gate.

As in the case of the embodiment shown in FIG. 7, the idle control signal at output 749 of delay stage 747 causes four functions to be produced by block 791. It should be noted that the idle control signal without delay can be provided by line 822 directly to block 791.

While there have been shown and described what are at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. A system for generating a drive current of variable current magnitude and frequency that drives an AC induction motor, comprising:
   (a) means for providing a first signal proportional to the rate of change of the flux of said motor;
   (b) means for supplying a second signal proportional to said current magnitude of said drive current; and
   (c) means for generating a flux signal proportional to the integral of said first signal when said frequency of said drive current is above a preselected value and which is proportional to said second signal when said frequency of said drive current is below said preselected value, said flux signal being effective to control the generation of said drive current.

2. The system of claim 1, further comprising means for generating a control signal when said frequency of said drive current is below said preselected value.

3. The system of claim 1, wherein said means for providing a first signal comprises a flux coil.

4. The system of claim 1, wherein said means for providing a first signal comprises means responsive to the terminal voltage of said motor.

5. The system of claim 2, wherein said means for generating a flux signal comprises:
   (a) means for integrating said first signal to provide said flux signal only in the absence of said control signal; and
   (b) signal divider means responsive to said second signal for providing said flux signal in response to said control signal.

6. The system of claim 5, wherein said means for integrating comprising:
   (a) amplifier means having an inverting input and an output, said inverting input connected to receive said first signal; and
   (b) capacitor means connected between said inverting input and said output.

7. The system of claim 6, wherein said signal divider means comprises:
   (a) resistor divider means having an input, an output and a divider output, said input connected to receive said second signal, said output connected to said output of said amplifier means and said divider output adapted to be connected to said inverting input of said amplifier means in response to said control signal.

8. The system of claim 1, wherein said preselected value of said frequency is less than or equal to 3 Hertz.

9. The system of claim 1, further comprising:
   (a) inverter means for generating said drive current of variable current magnitude and frequency for driving said AC induction motor.

10. The system of claim 1, wherein said preselected value of said frequency is less than or equal to 0.5 Hertz.

11. Apparatus having an AC induction motor with stator windings arranged with respect to a first axis and a second axis and inverter means for generating a variable current magnitude and frequency drive current that is applied to said stator windings to produce a flux having a first axis component and a second axis component, which comprises:
   (a) means for providing a first signal proportional to the rate of change of said second axis component of said flux;
   (b) means for supplying a second signal proportional to the current magnitude of that portion of said drive current that produces said second axis component of said flux;
   (c) means for causing said inverter to generate said drive current for producing flux having only said second axis component when said drive current frequency is below a preselected value; and
   (d) means for generating a flux signal proportional to the integral of said first signal when said frequency of said drive current is above said preselected value and which is proportional to said second signal when said frequency of said drive current is below said preselected value, said flux signal being effective to control the generation of said drive current.

12. The apparatus of claim 11, wherein said means for supplying said second signal includes means to supply said second signal at a predetermined constant value.

13. The apparatus of claim 11, further comprising means for generating a control signal when said frequency of said drive current is below said preselected value.

14. The system of claim 13, wherein said means for generating a flux signal comprises:
   (a) means for integrating said first signal to provide said flux signal only in the absence of said control signal; and
   (b) signal divider means responsive to said second signal for providing said flux signal in response to said control signal.

15. The apparatus of claim 11, wherein said means for causing said inverter to generate said drive current comprises:
   (a) predetermined conduction state means for providing preselected gating signals when said frequency is below said preselected value; and
   (b) control means responsive to said preselected gating signals for controlling said inverter to generate said drive current for producing flux only having said second axis component.

16. Apparatus having an AC induction motor with stator windings arranged with respect to a first axis and a second axis and inverter means for generating a variable current magnitude and frequency drive current that is applied to said stator windings to produce a flux having a first axis component and a second axis component, which comprises:
   (a) means for providing a first signal proportional to the rate of change of said first axis component of said flux;
   (b) means for supplying a second signal proportional to the current magnitude of that portion of said drive current that produces said first axis component of said flux; and
   (c) means for generating a first flux signal proportional to the integral of said first signal when said frequency of said drive current is above a preselected value and which is proportional to said second signal when said frequency of said drive current is below said preselected value, said first flux signal being effective to control the generation of said drive current.

17. The apparatus of claim 16, further comprising means for generating a control signal when said frequency of said drive current is below said preselected value.

18. The apparatus of claim 17, wherein said means for generating a flux signal comprises:
(a) means for integrating said first signal to provide said flux signal only in the absence of said control signal; and
(b) signal divider means responsive to said second signal for providing said flux signal in response to said control signal.

19. The apparatus of claim 16, further comprising:
(a) means for providing a third signal proportional to the rate of change of said second axis component of said flux;
(b) means for supplying a fourth signal proportional to the current magnitude of that portion of said drive current that produces said second axis component of said flux; and
(c) means for generating a second flux signal proportional to the integral of said third signal when said frequency of said drive current is above a preselected value and which is proportional to said fourth signal when said frequency of said drive current is below said preselected value, said second flux signal being effective to control the generation of said drive current.

20. The apparatus of claim 19, wherein said first axis and said second axis are substantially orthogonal with respect to each other.

21. The apparatus of claim 19, wherein said stator windings are arranged with respect to a first axis, a second axis and a third axis,
wherein said inverter means generates said drive current that is applied to said stator windings to produce a flux having a first axis component, a second axis component and a third axis component,
further comprising means for providing a fifth signal proportional to the rate of change of said third axis component of said flux,
further comprising means for supplying a sixth signal proportional to the current magnitude of that portion of said drive current that produces said third axis component of said flux, and
further comprising means for generating a third flux signal proportional to the integral of said fifth signal when said frequency of said drive current is above a preselected value and which is proportional to said sixth signal when said frequency of said drive current is below said preselected value, said third flux signal being effective to control the generation of said drive current.

22. The apparatus of claim 21, wherein said first axis, said second axis and said third axis are substantially 120° with respect to each other.

23. An electric motor apparatus having an AC induction motor producing a rotation in response to a drive current of variable current magnitude and frequency comprising:
(a) means for establishing a rotation reference signal proportional to a desired level of rotation;
(b) means for generating an actual rotation signal proportional to said rotation;
(c) means for generating a rotation difference signal representative of any difference between said rotation reference signal and said actual rotation signal;
(d) means for producing a torque command signal in accordance with said rotation difference signal and for producing a frequency control signal and a current control signal as functions of said torque command signal;
(e) means for generating an idle control signal when said torque command signal and at least two of said actual rotation signal, rotation reference signal and rotation difference signal are less than respective predetermined values;
(f) means for supplying to said motor said drive current at a frequency controlled in response to said frequency control signal and at a current magnitude varied in accordance with said current control signal;
(g) means for providing a first signal proportional to the rate of change of the flux of said motor;
(h) means for supplying a second signal proportional to said current magnitude of said drive current; and
(i) means for generating a flux signal proportional to the integral of said first signal when said idle control signal is absent and which is proportional to said second signal when said idle control signal is present, said flux signal being effective to control the generation of said current control signal.

24. The apparatus of claim 23, wherein said means for establishing a rotation reference signal establishes a torque reference signal proportional to a desired level of torque,
wherein said means for generating a rotation difference signal is absent,
wherein said means for generating a torque command signal generates said torque command signal in response to said torque reference signal, and
wherein said means for generating an idle control signal generates said idle control signal when said actual rotation signal and said torque reference signal are less than respective predetermined values.

25. In a method for generating a drive current of variable current magnitude and frequency that drives an AC induction motor, the improvement comprising the steps of:
(a) providing a first signal proportional to the rate of change of the flux of said motor;
(b) supplying a second signal proportional to said current magnitude of said drive current; and
(c) generating a flux signal proportional to the integral of said first signal when said frequency of said drive current is above a preselected value and which is proportional to said second signal when said frequency of said drive current is below said preselected value, said flux signal being effective to control the generation of said drive current.

26. Method for controlling an AC induction motor with stator windings arranged with respect to a first axis and a second axis which receives electric power from inverter means for generating a variable current magnitude and frequency drive current that is applied to said stator windings to produce a flux having a first axis component and a second axis component, which method comprises the steps of:
(a) providing a first signal proportional to the rate of change of said second axis component of said flux;
(b) supplying a second signal proportional to the current magnitude of that portion of said drive current that produces said second axis component of said flux;

(c) causing said inverter to generate said drive current for producing flux having only said second axis component; and (d) means for generating a flux signal proportional to the integral of said first signal when said frequency of said drive current is above said preselected value and which is proportional to said second signal when said frequency of said drive current is below said preselected value, said flux signal being effective to control the generation of said drive current.

27. Method for controlling the AC induction motor with stator windings arranged with respect to a first axis, a second axis and a third axis which receives electric power from inverter means for generating a variable current magnitude and frequency drive current that is applied to said stator windings to produce a flux having a first axis component, a second axis component and a third axis component, which method comprises the steps of:

(a) providing a first signal proportional to the rate of change of said first axis component of said flux;

(b) supplying a second signal proportional to the magnitude of that portion of said drive current that produces said first axis component of said flux;

(c) generating a first flux signal proportional to the integral of said first signal when said frequency of said drive current is above a preselected value and which is proportional to said second signal when said frequency of said drive current is below said preselected value;

(d) providing a third signal proportional to the rate of change of said second axis component of said flux;

(e) supplying a fourth signal proportional to the magnitude of that portion of said drive current that produces said second axis component of said flux;

(f) generating a second flux signal proportional to the integral of said third signal when said frequency of said drive current is above a preselected value and which is proportional to said fourth signal when said frequency of said drive current is below said preselected value;

(g) providing a fifth signal proportional to the rate of change of said third axis component of said flux;

(h) supplying a sixth signal proportional to the magnitude of that portion of said drive current that produces said third axis component of said flux; and (i) generating a third flux signal proportional to the integral of said fifth signal when said frequency of said drive current is above a preselected value and which is proportional to said sixth signal when said frequency of said drive current is below said preselected value, said first flux signal, said second flux signal and said third flux signal being effective to control the generation of said drive current.

* * * * *